(12) United States Patent
Kubotera et al.

(10) Patent No.: US 9,756,226 B2
(45) Date of Patent: Sep. 5, 2017

(54) ELECTRONIC APPARATUS

(71) Applicant: SONY CORPORATION, Tokyo (JP)

(72) Inventors: Tomoyuki Kubotera, Tokyo (JP); Kazuhiro Nishida, Tokyo (JP); Takayuki Ito, Tokyo (JP); Osamu Toyoshima, Tokyo (JP); Akihiro Baba, Kanagawa (JP); Tsuyoshi Umemura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 30 days.

(21) Appl. No.: 14/796,052

(22) Filed: Jul. 10, 2015

(65) Prior Publication Data
US 2016/0028927 A1 Jan. 28, 2016

(30) Foreign Application Priority Data
Jul. 22, 2014 (JP) .................. 2014-149266

(51) Int. Cl.
*H04N 5/225* (2006.01)
*G03B 17/02* (2006.01)

(52) U.S. Cl.
CPC ........... *H04N 5/2252* (2013.01); *G03B 17/02* (2013.01); *H04N 5/2251* (2013.01)

(58) Field of Classification Search
CPC ..... H04N 5/2252; H04N 5/2251; G03B 17/02
See application file for complete search history.

(56) References Cited

U.S. PATENT DOCUMENTS

| 5,661,823 A * | 8/1997 | Yamauchi | G11B 27/028 348/E5.025 |
| 2007/0211162 A1* | 9/2007 | Kaihara | G02B 27/0006 348/335 |
| 2013/0002795 A1* | 1/2013 | Shavelsky | A61J 7/04 348/14.01 |

FOREIGN PATENT DOCUMENTS

| JP | 2009-177362 A | 8/2009 |
| JP | 3190001 U | 3/2014 |

* cited by examiner

*Primary Examiner* — Tuan Ho
(74) *Attorney, Agent, or Firm* — Chip Law Group

(57) ABSTRACT

An electronic apparatus includes: a main body including a housing section that houses a battery; a lid attached to the main body to cover the housing section, the lid being adapted to perform state shift between a closed state and an open state; and a locking member attached to the main body, the locking member locking the lid both in the closed state and in the open state.

17 Claims, 19 Drawing Sheets

ELECTRONIC APPARATUS

CROSS REFERENCE TO RELATED APPLICATIONS

This application claims the benefit of Japanese Priority Patent Application JP 2014-149266 filed Jul. 22, 2014, the entire contents of which are incorporated herein by reference.

BACKGROUND

The present disclosure relates to an electronic apparatus using a battery as a power source.

A mobile electronic apparatus represented by an image pickup apparatus such as a video camera and a still camera includes an interchangeable battery. A small electronic apparatus that is adapted to perform image pickup operation in cooperation with an external electronic apparatus such as a smartphone is proposed so far (see Japanese Utility Model Registration No. 3190001).

SUMMARY

However, in recent years, improvement of operability is desirably achieved together with downsizing.

It is desirable to provide an electronic apparatus excellent in operability.

According to an embodiment of the disclosure, there is provided an electronic apparatus including: a main body including a housing section that houses a battery; a lid attached to the main body to cover the housing section, the lid being adapted to perform state shift between a closed state and an open state; and a locking member attached to the main body, the locking member locking the lid both in the closed state and in the open state.

In the electronic apparatus according to the embodiment of the disclosure, the locking member locks the lid both in the closed state and the open state. Therefore, in the open state, insertion and ejection of the battery to/from the housing section of the main body are easily performed. On the other hand, in the closed state, the state where the battery is housed is maintained.

According to the electronic apparatus as the embodiment of the disclosure, it is possible to further improve the operability. For example, the lid is prevented from unintentionally opening in the closed state while operability during insertion and ejection of the battery is improved, which makes it possible to avoid interference of operation of the electronic apparatus. Incidentally, effects described here are non-limiting. Effects achieved by the technology may be one or more of effects described below.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
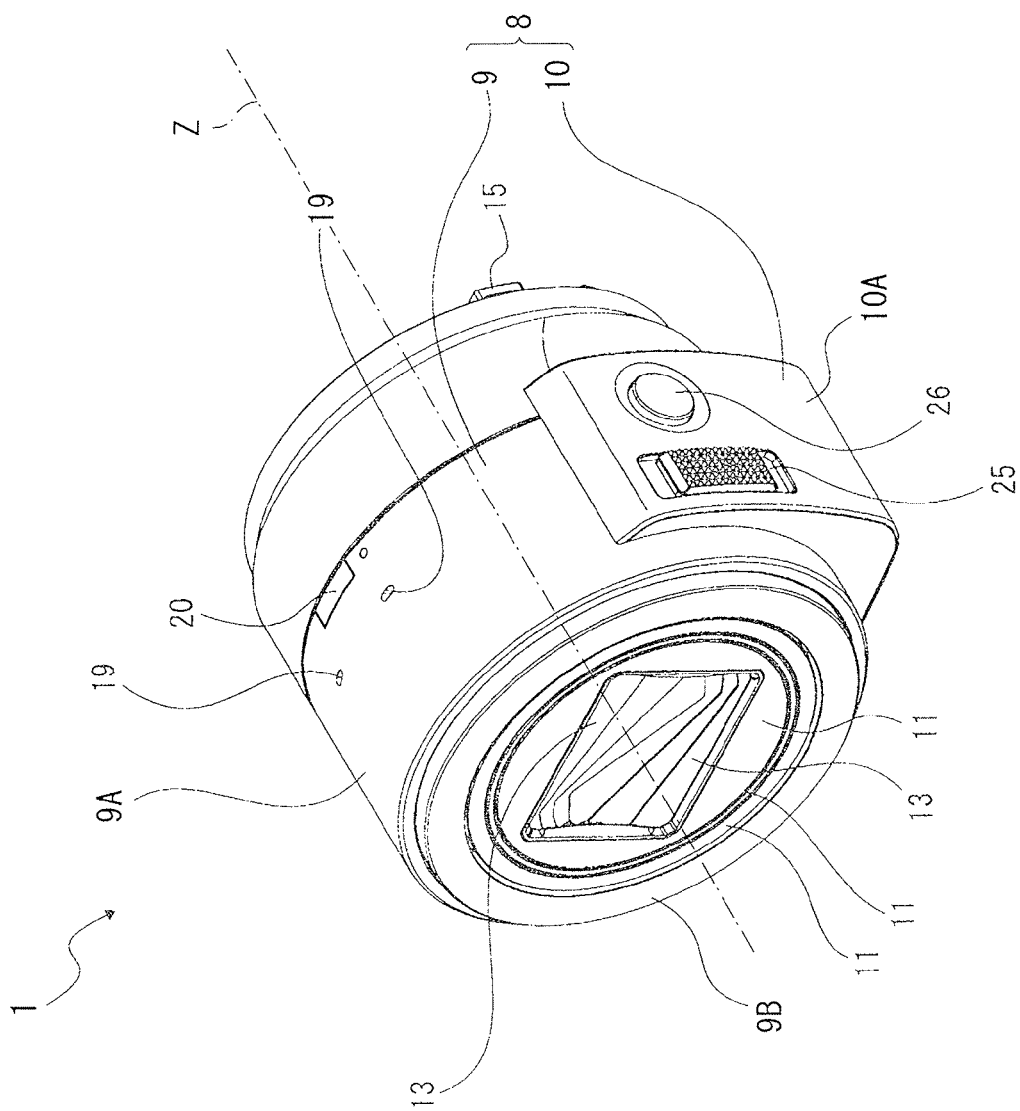
FIG. 1 is a perspective view illustrating an appearance of an image pickup apparatus according to an embodiment.

Hereinafter, an embodiment of the disclosure will be described in detail with reference to drawings. Note that description will be given in the following order.
1. Image pickup apparatus
2. Basic configuration
3. Configuration of main part
4. Open and close operation of battery lid
5. Operation of battery exchange
6. Modification
7. Application examples
8. Internal configuration
9. Image pickup operation 1. Basic Configuration of Image Pickup Apparatus 1

FIG. 1 to FIG. 7 are a perspective view, a front view, a back view, a top view, a bottom view, a right side view, and a left side view, respectively, each illustrating an appearance of an image pickup apparatus 1 as an embodiment of the disclosure. FIG. 8 is another perspective view illustrating the appearance of the image pickup apparatus 1. Note that FIG. 1 illustrates the image pickup apparatus 1 in a retracted state in which an inner barrel 11 (described later) is retracted in a lens barrel 9 (described later), and FIG. 8 illustrates the image pickup apparatus 1 in an extended state in which a part of the inner barrel 11 is extended to the outside of the lens barrel 9.

The image pickup apparatus 1 includes a main body 8 that houses a battery BC (described later), a battery lid 18 that is attached to the main body 8 and is adapted to perform state shift between a closed state and an open state, and a click spring 51 that locks the battery lid 18 both in the closed state and the open state. In the following description, directions of front and back, up and down, and right and left of the image pickup apparatus 1 are illustrated as viewed from a photographer (a user). Therefore, an object side is referred to as a front side, and a photographer side is referred to as a back side. Note that the directions of front and back, up and down, and right and left described below are denoted for convenience of description, and implementation of the technology is not limited to these directions.

The main body 8 includes an outer barrel 9 and a rolling prevention section 10. One or more image pickup lenses 14 (see FIG. 8) and an image pickup device 62 (illustrated in FIG. 20 described later) are provided in the outer barrel 9. In the image pickup apparatus 1, light taken-in through the image pickup lens 14 is photoelectrically converted by the image pickup device 62.

The outer barrel 9 includes a barrel part 9A that houses the image pickup lens 14, an annular overhanging part 9B that overhangs from a front end of the barrel part 9A to the front side, and a rear part 9C that is provided at a rear end of the barrel part 9A. In the barrel part 9A, an outer shape of a sectional surface orthogonal to a front-back direction that is an optical axis direction (referred to as a Z-axis direction) of the image pickup lens 14 substantially forms a circular shape.

The rolling prevention section 10 may be provided on bottom surface side of the barrel part 9A so as to project from the barrel part 9A to the outside in a direction orthogonal to the optical axis direction of the image pickup lens 14. The rolling prevention section 10 has a function of preventing the image pickup apparatus 1 from rolling at the time when the image pickup apparatus 1 is placed on a placing surface of a desk, a table, or the like. Therefore, breakage and failure of the image pickup apparatus 1 caused by a fall, etc. are avoided by the rolling prevention section 10. For example, a zoom lever 25 and a photographing button 26 may be provided on a side surface 10A of the rolling prevention section 10.

A plurality of inner barrels 11 (11A to 11C) that are movably formed along the optical axis direction of the image pickup lens 14 are supported in the outer barrel 9 (see FIG. 1 and FIG. 8). For example, the inner barrel 11A may be located at innermost side, the inner barrel 11B may be provided outside the inner barrel 11A so as to surround the inner barrel 11A, and the inner barrel 11C may be further provided outside the inner barrel 11B so as to surround the inner barrel 11B. The outside of the inner barrel 11C is surrounded by the outer barrel 9. Incidentally, although the case where the three inner barrels 11A, 11B, and 11C are provided is exemplified here, the number of inner barrels 11 is not limited thereto. In other words, one or two inner barrels 11 may be provided, or four or more inner barrels 11 may be provided.

When the inner barrel 11 is extended to the front side of the outer barrel 9, the image pickup apparatus 1 is put into the photographing state (FIG. 8). When the inner barrel 11 extended to the front side is withdrawn backward and retracted in the outer barrel 9, the image pickup apparatus 1 is put into the retracted state (FIG. 1). The image pickup apparatus 1 performs state shifting between the retracted state (FIG. 1) and the photographing state (FIG. 8).

A substantially rectangular light transmission hole 12 (FIG. 8) and a lens barrier 13 are provided on a front surface of the innermost inner barrel 11A. The lens barrier 13 is openably and closably supported by the inner barrel 11A. The lens barrier 13 is put into the closed state in the retracted state, and is put into the open state in the photographing state. Therefore, the light transmission hole 12 of the inner barrel 11A is closed by the lens barrier 13 in the retracted state (FIG. 3), and the light transmission hole 12 is opened by the lens barrier 13 in the photographing state (FIG. 8). In the state where the lens barrier 13 is opened, external light enters the image pickup lens 14 provided in the inner barrel 11A from the light transmission hole 12.

Figure 3:
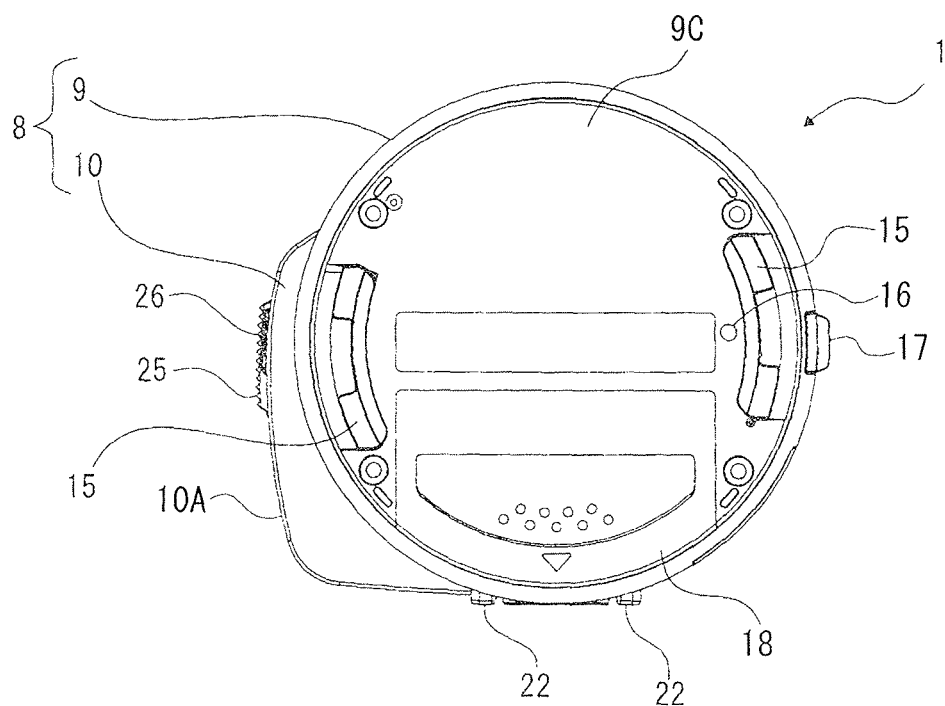
FIG. 3 is a back view illustrating the appearance of the image pickup apparatus illustrated in FIG. 1.

A pair of connecting projections 15 projecting backward is provided separately from each other in a circumferential direction, on an outer peripheral part in the rear part 9C of the outer barrel 9 (FIG. 3). A lock pin 16 is supported so as to be movable in the front-back direction in the vicinity of the connecting projection 15 in the rear part 9C. The lock pin 16 is biased backward by a spring (not illustrated).

Figure 7:
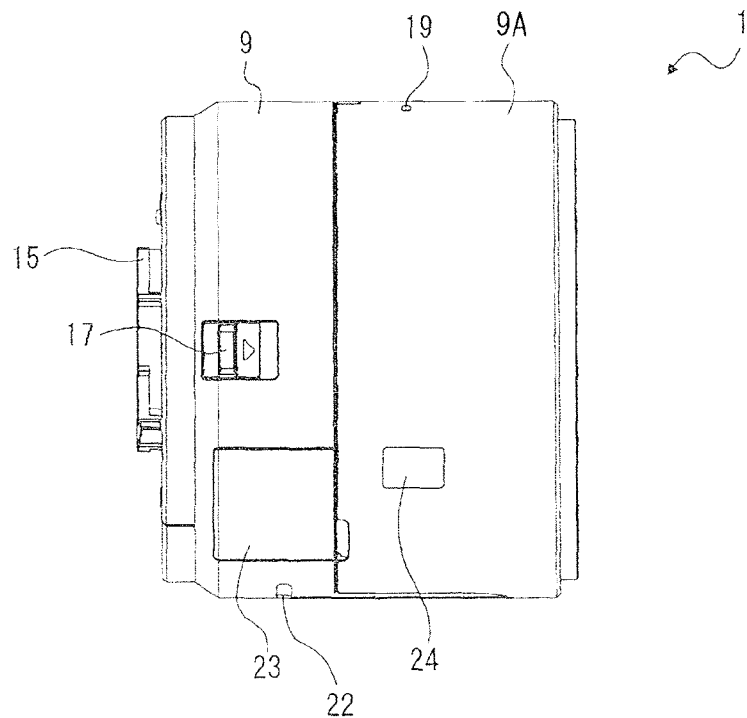
FIG. 7 is a left side view illustrating the appearance of the image pickup apparatus illustrated in FIG. 1.
Figure 8:
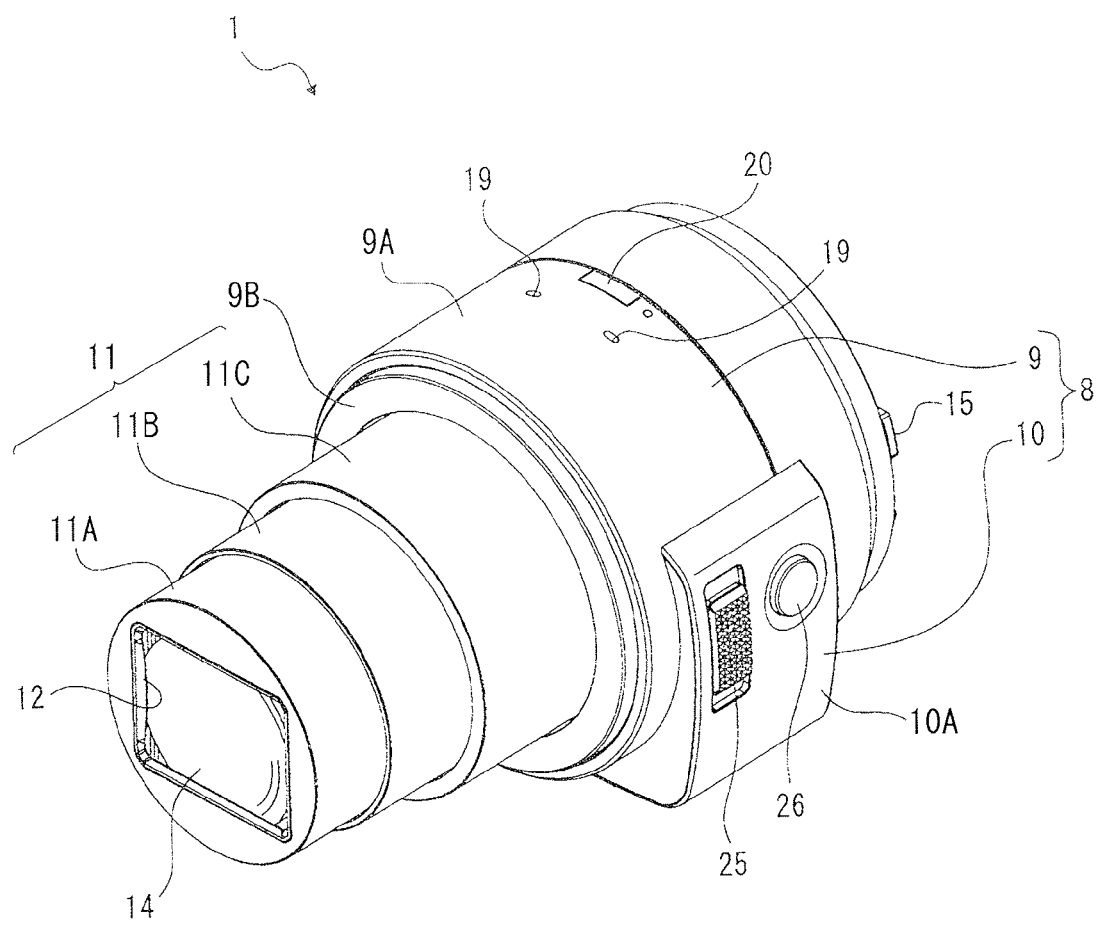
FIG. 8 is a perspective view illustrating the appearance of the image pickup apparatus illustrated in FIG. 1, in an extended state.

A lock releasing lever 17 is provided at a rear end of the barrel part 9A of the outer barrel 9 (FIG. 7). When the lock releasing lever 17 is operated, the lock pin 16 is taken in the inside of the outer barrel 9. The connecting projections 15 are connected with an adapter 2 described later.

Figure 4:
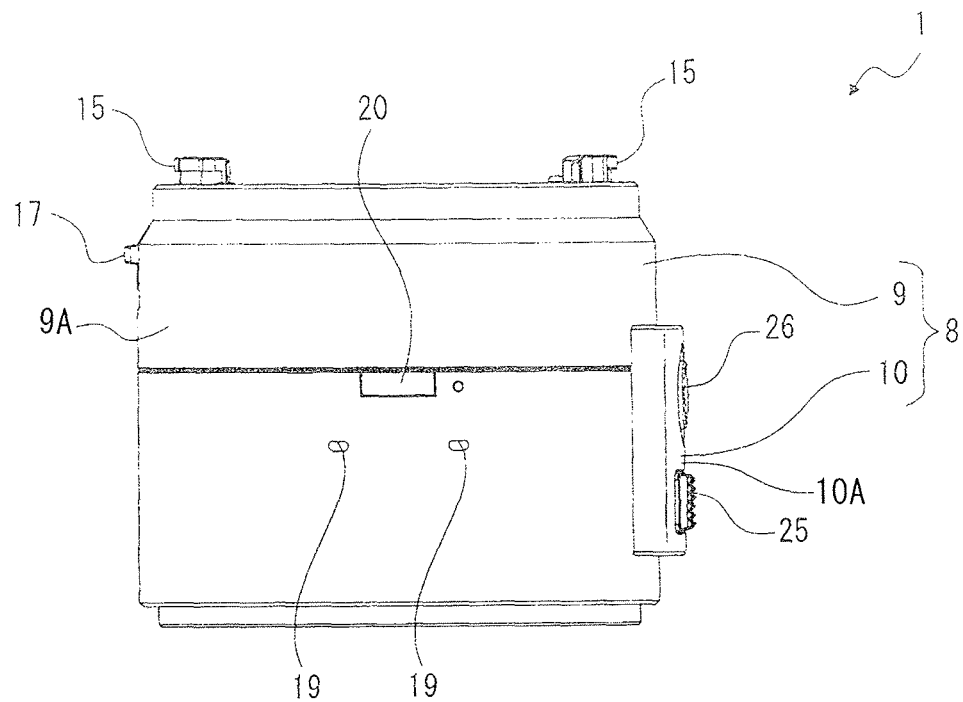
FIG. 4 is a top view illustrating the appearance of the image pickup apparatus illustrated in FIG. 1.

A microphone 19 and a power button 20 are provided separately in the front-back direction at an upper end of the barrel part 9A of the outer barrel 9 (FIG. 1 and FIG. 4). The microphone 19 is used for inputting external sound.

The power button 20 may be preferably provided in such a manner that a surface of the power button 20 does not project outside the outer periphery of the barrel part 9A. This is because the power button 20 does not project outside the outer periphery of the barrel part 9A, which prevents wrong operation of the power button 20. When the power button 20 is operated, the image pickup apparatus 1 is turned on or turned off. When the image pickup apparatus 1 is turned on, the inner barrel 11 is extended to the front side of the outer barrel 9 and the photographing state is set (FIG. 8). When the image pickup apparatus 1 is turned off, the inner barrel 11 extended to the front side is withdrawn backward and retracted inside the outer barrel 9, and therefore, the retracted state is set (FIG. 1).

Figure 2:
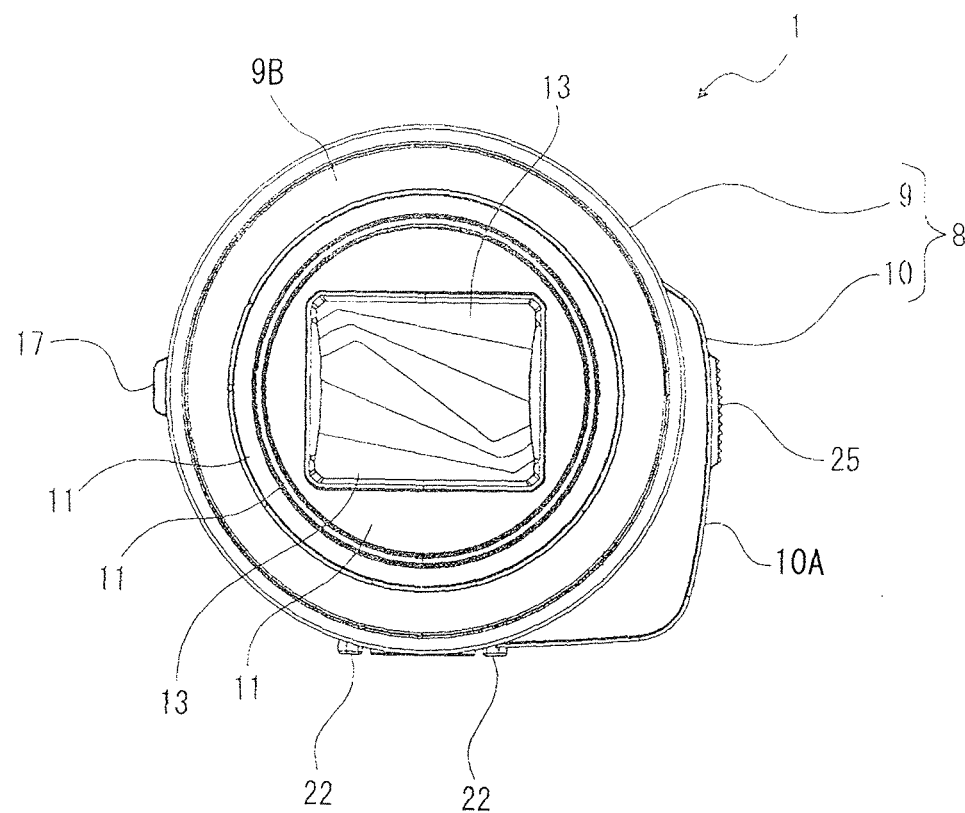
FIG. 2 is a front view illustrating the appearance of the image pickup apparatus illustrated in FIG. 1.
Figure 5:
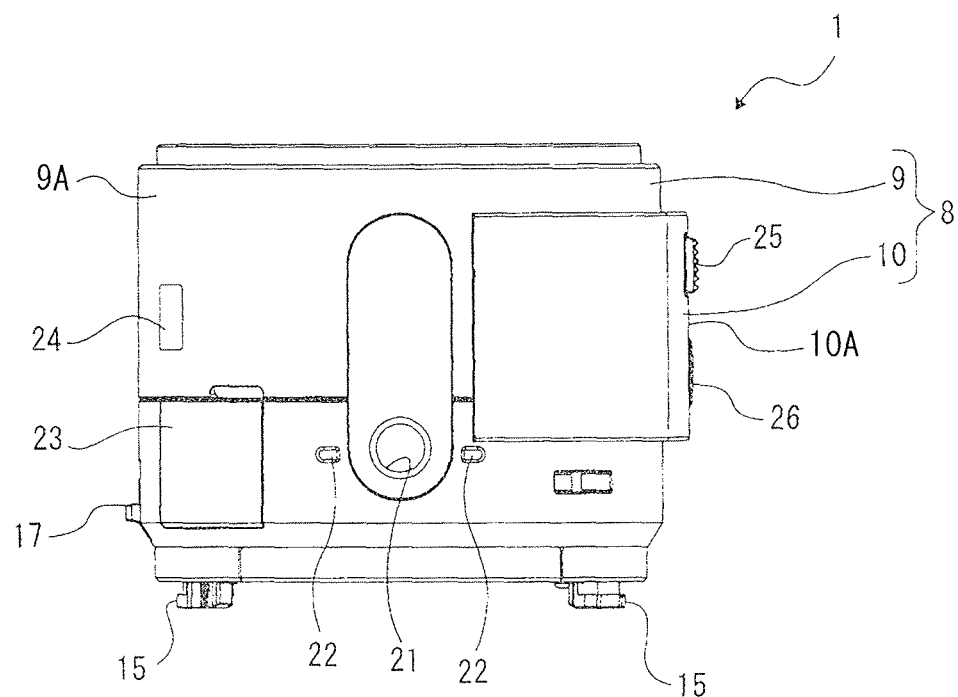
FIG. 5 is a bottom view illustrating the appearance of the image pickup apparatus illustrated in FIG. 1.

A tripod hole 21 is provided on a bottom end of the barrel part 9A of the outer barrel 9 (FIG. 5). The tripod hole 21 is a hole to connect the image pickup apparatus 1 to a tripod (not illustrated) at the time of photographing and the like. Rolling regulation projections 22 are provided on left side and right side of the tripod hole 21 at the bottom end of the barrel part 9A of the outer barrel 9 (FIG. 2 and FIG. 5). The rolling regulation projections 22 each have a function of reinforcing the function of the rolling prevention section 10. Rolling of the image pickup apparatus 1 at the time when the image pickup apparatus 1 is placed on a desk, a table, or the like is regulated by the rolling regulation projections 22, which prevents breakage and failure of the image pickup apparatus 1 caused by a fall, etc.

A cover body 23 is provided at a position close to a bottom end of the rear end of the barrel part 9A of the outer barrel 9 (FIG. 5 and FIG. 7). In the image pickup apparatus 1, an external connection terminal such as a universal serial bus (USB) and a memory card slot (both not illustrated) are provided at the inside of the cover body 23. Therefore, when the cover body 23 is opened, it is possible to perform connection with an external device and mounting of a memory card. In addition, the connection with an external device makes it possible to record an image and a picture that are picked up by the image pickup apparatus 1 to the external device, and the mounting of a memory card makes it possible to record an image and a picture that are picked up by the image pickup apparatus 1, to the memory card.

A display section 24 such as a liquid crystal panel is disposed at a right end of the barrel part 9A of the outer barrel 9. For example, a residual amount of the battery BC, presence or absence of the memory card in the memory card slot, etc. may be displayed on the display section 24.

The display section 24 is provided, which makes it possible to confirm the residual amount of the battery and the presence or absence of the memory card in the memory slot from outside of the image pickup apparatus 1. Thus, it is possible to improve usability of the image pickup apparatus 1.

Figure 6:
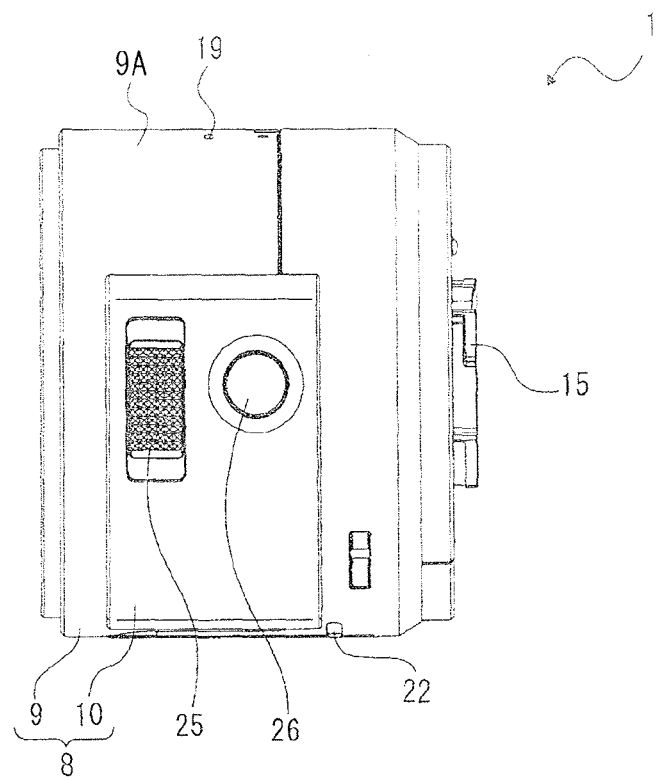
FIG. 6 is a right side view illustrating the appearance of the image pickup apparatus illustrated in FIG. 1.

The zoom lever 25 that is used to vary magnification and the photographing button 26 that functions as a shutter at the time of photographing a still image are disposed close to each other in a front-back direction on the side surface 10A of the rolling prevention section 10 (see FIG. 1 and FIG. 6). When the zoom lever 25 is operated, zooming is performed between telephotography and wide angle, and when the photographing button 26 is operated, an image of an object is picked up. Note that the photographing button 26 functions as a switch button of start and stop of moving picture photographing at the time of photographing a moving picture.

For example, the zoom lever 25 may be operated by being moved in top-down direction. When the zoom lever 25 is moved and operated in a predetermined direction in this way, zooming is performed. Therefore, it is possible to secure favorable operability, and to improve usability of the image pickup apparatus 1. In addition, the zoom lever 25 and the photographing button 26 are disposed close to each other, which facilitate a series of photographing operation in which a user performs viewing angle adjustment by zooming operation and then performs photographing operation, and thus it is possible to improve usability of the image pickup apparatus 1. Placement of the zoom lever 25 and the photographing button 26 is not limited to that illustrated in FIG. 1 and the like. The zoom lever 25 and the photographing button 26 may be disposed close to each other in top-down direction or an oblique direction.

For example, a function in which autofocus is performed when the photographing button 26 is half-pressed and photographing is performed when the photographing button 26 is fully pressed may be added to the photographing button 26.

In addition, the image pickup apparatus 1 may include a sound output section, and electronic sound or the like may be output from the sound output section during autofocus operation. As a result, execution of operation is recognized by a user, and it is possible to improve certainty of operation.

Further, in the image pickup apparatus 1, the zoom lever 25 and the photographing button 26 are provided on the side surface 10A of the rolling prevention section 10 so that the zoom lever 25 and the photographing button 26 are distanced from the microphone 19 that is provided on the top end of the barrel part 9A. As a result, the electronic sound related to the operation of the zoom lever 25 or the like by the user is difficult to be input to the microphone 19, and thus it is possible to suppress degradation of sound volume.

Furthermore, since the power button 20 and the photographing button 26 are disposed separately from each other in a circumferential direction of the main body 8, wrong operation between the power source operation and the photographing operation is difficult to occur.

2. Configuration of Main Part of Image Pickup Apparatus 1

The battery lid 18 that is used when the battery BC (described later) is mounted and taken-out is provided between the pair of connecting projections 15 in the rear part 9C of the outer barrel 9 (FIG. 3). In other words, the battery lid 18 is provided on a back surface of the main body 8 on a side opposite to the light transmission hole 12. With reference to FIG. 9 to FIG. 15B, the configuration of the battery lid 18 and the vicinity thereof is described in detail below. The battery lid 18 is provided openably and closably on the rear part 9C.

Figure 9A:
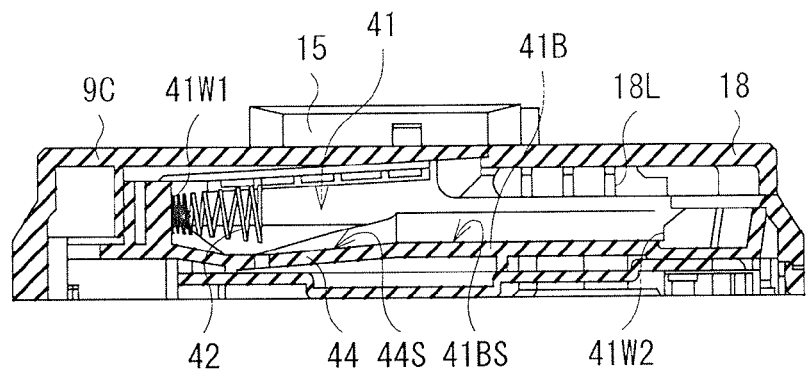
FIG. 9A is a sectional diagram illustrating a vicinity of a rear part of an outer barrel in the image pickup apparatus illustrated in FIG. 1 in an enlarged manner.
Figure 9B:
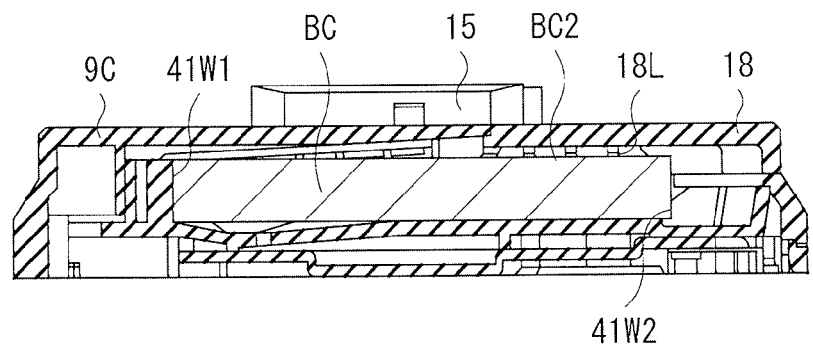
FIG. 9B is another sectional diagram illustrating the vicinity of the rear part of the outer barrel in the image pickup apparatus illustrated in FIG. 1 in an enlarged manner.
Figure 9C:
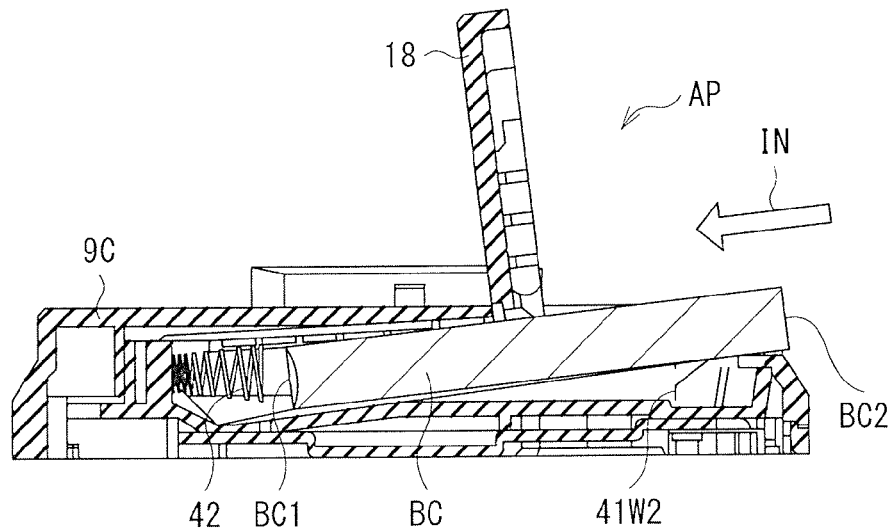
FIG. 9C is a sectional diagram illustrating a state where a battery lid of the outer barrel in the image pickup apparatus illustrated in FIG. 1 is opened.
Figure 9D:
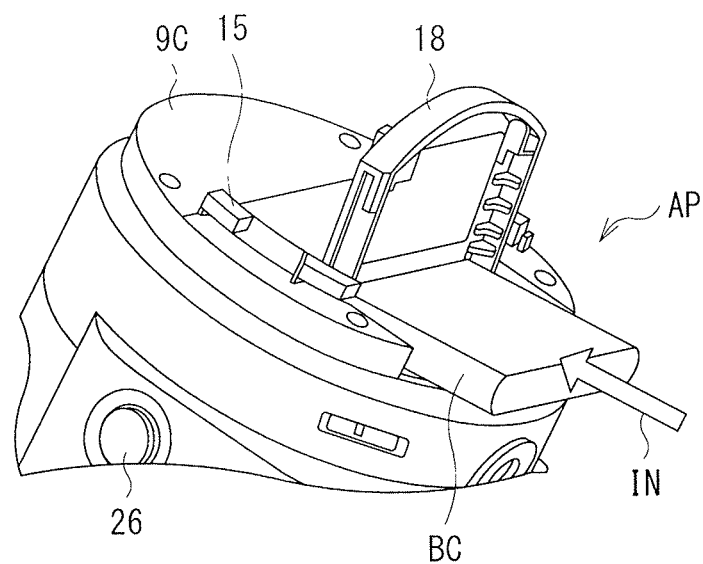
FIG. 9D is a perspective view illustrating a state where the battery lid of the outer barrel in the image pickup apparatus illustrated in FIG. 1 is opened.
Figure 9E:
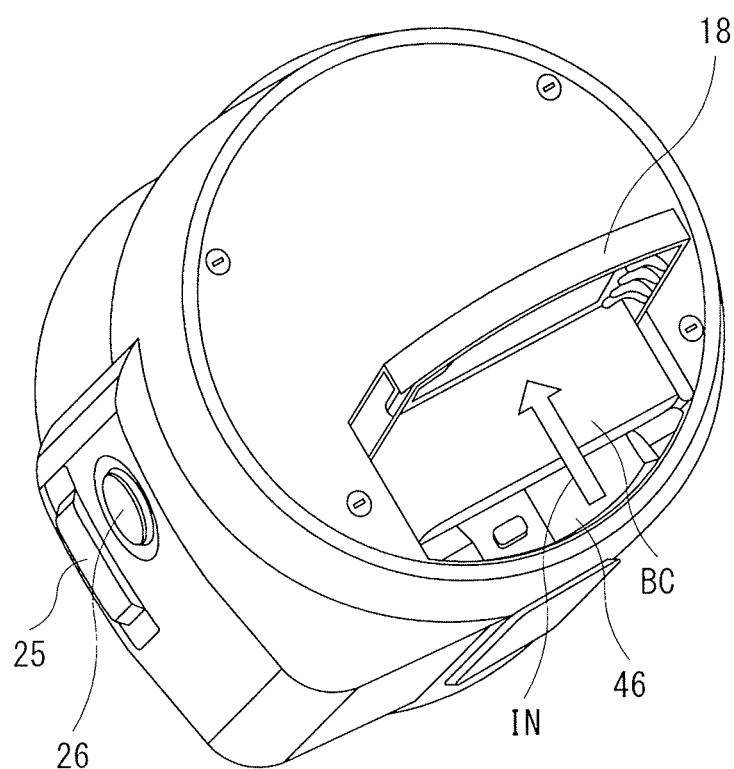
FIG. 9E is another perspective view illustrating the state where the battery lid of the outer barrel in the image pickup apparatus illustrated in FIG. 1 is opened.

FIG. 9A and FIG. 9B are sectional diagrams along the optical axis, each illustrating the vicinity of the rear part 9C of the outer barrel 9 in an enlarged manner. FIG. 9A illustrates an empty state where the battery BC is not mounted, and FIG. 9B illustrates a state where the battery BC is mounted. In addition, FIG. 9C to FIG. 9E each illustrate an open state where the battery lid 18 is opened, namely, a state where the battery BC is capable of being mounted or taken-out. Among them, FIG. 9C and FIG. 9D are a sectional diagram and a perspective view, respectively, each illustrating a middle state during insertion or take-out of the battery BC, and FIG. 9E is a perspective view illustrating a state where the battery BC is mounted on the predetermined position. Incidentally, in FIG. 9E, illustration of the pair of connecting projections 15 is omitted. Moreover, in contrast to the open state illustrated in FIG. 9C to FIG. 9E, the state illustrated in FIG. 9A and FIG. 9B is referred to as a closed state. The closed state denotes a state where a battery mounting section 41 (described later) or the battery BC is invisible from outside, namely, a state where the battery BC is not capable of being mounted and taken-out.

Figure 10A:
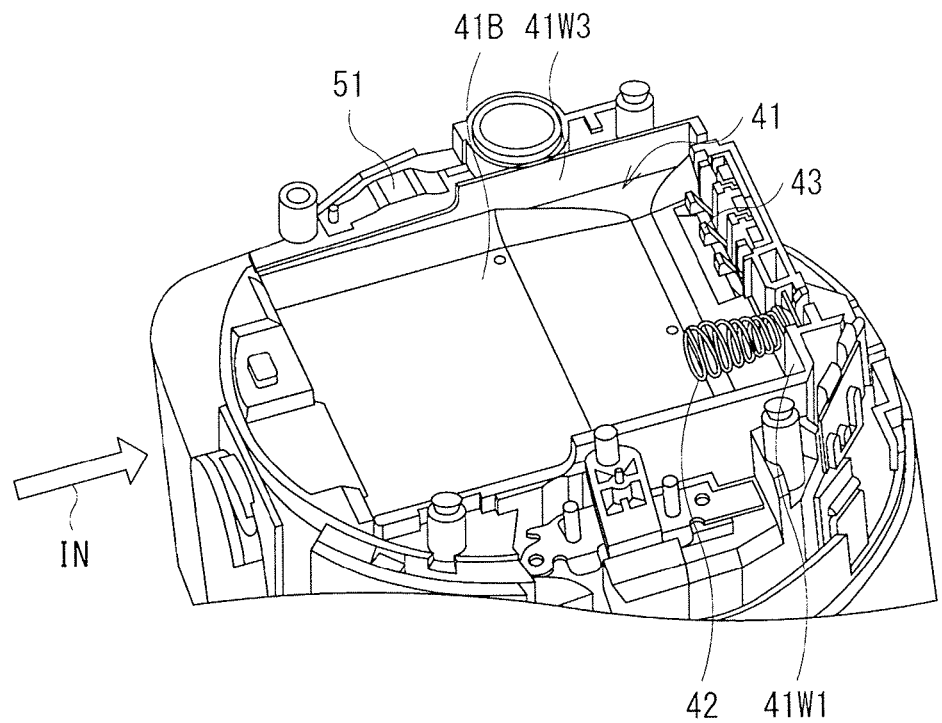
FIG. 10A is a perspective view illustrating a battery mounting section and the vicinity thereof in the outer barrel of the image pickup apparatus illustrated in FIG. 1.
Figure 10B:
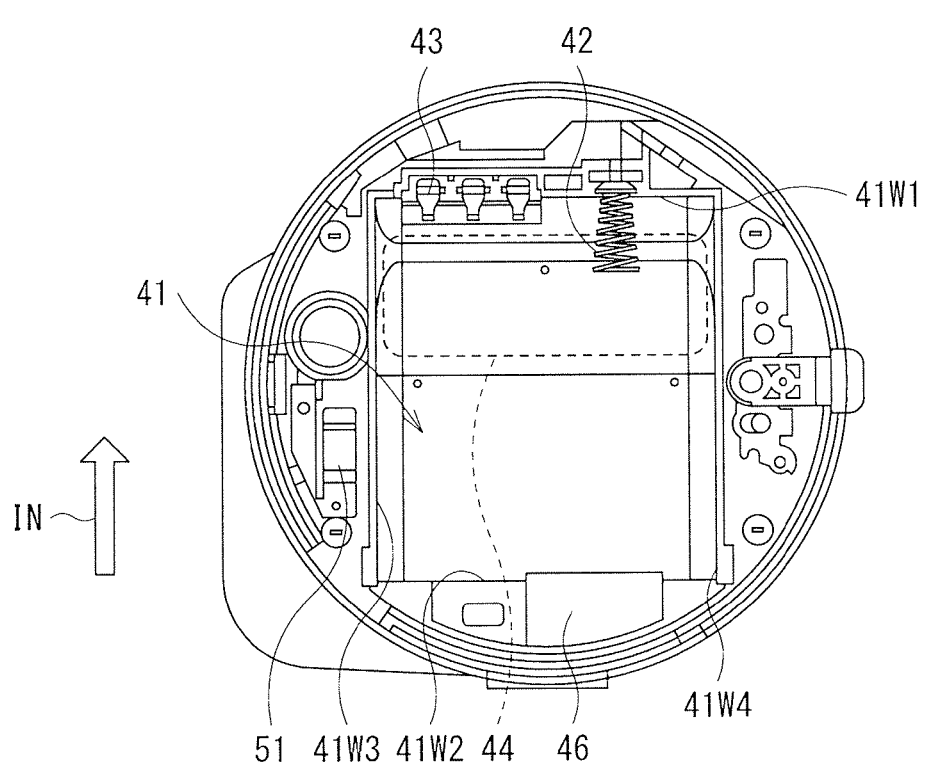
FIG. 10B is a top view illustrating the battery mounting section and the vicinity thereof in the outer barrel of the image pickup apparatus illustrated in FIG. 1.

Further, FIG. 10A and FIG. 10B are a perspective view and a top view, respectively, each illustrating the rear end of the outer barrel 9 in a state where the battery lid 18 and the rear part 9C are removed in an enlarged manner. The battery lid 18 shifts from the closed state to the slid state in which the battery lid 18 is slid in a first direction (the X-axis direction) orthogonal to the optical axis (the Z-axis direction) of the image pickup lens 14, and further the battery lid 18 pivots around a pivot axis J (described later) orthogonal to the first direction to reach the open state from the slid state. Open-close operation of the battery lid 18 will be described in detail later. The insertion direction (or the take-out direction) of the battery BC is substantially coincident with the first direction (the X-axis direction) that is a slide direction of the battery lid 18, however, slightly has a vector component of the Z-axis direction.

As illustrated in FIG. 10A and FIG. 10B, the battery mounting section 41 that is a specific but non-limiting example of a housing section housing the battery BC inside the battery lid 18 is provided in the outer barrel 9 of the image pickup apparatus 1. Opening or closing the battery lid 18 makes it possible to mount and take out the battery BC to/from the battery mounting section 41. In other words, the battery lid 18 is so attached to the outer barrel 9 as to cover the battery mounting section 41, and is adapted to perform state shift between the closed state and the open state. The battery BC may be, for example, a lithium ion secondary battery. The battery lid 18 covers only a part of the battery mounting section 41. As illustrated in FIG. 9C to FIG. 9E, in the open state where the battery lid 18 stands on the rear part 9C, an opening AP through which the battery BC passes at the time of ejection and insertion of the battery BC is formed by the battery lid 18, the barrel part 9A, and the rear part 9C.

The battery mounting part 41 includes a bottom part 41B facing the battery lid 18, and four walls 41W (41W1 to 41W4) that stand to surround four sides along an outer edge of the bottom part 41B. A part of the region of the battery mounting section 41 is covered with the battery lid 18, and other regions thereof is covered with the rear part 9C. Therefore, a substantially rectangular parallelepiped space along the outer shape of the battery BC is formed by the bottom part 41B, the four walls 41W, the battery lid 18 and the rear part 9C. Incidentally, a recess 44 is provided at a part of the bottom part 41B. The recess 44 is provided at a position close to the wall 41W1 rather than the middle position between the wall 41W1 and the wall 41W2. A width of the recess 44 in a second direction (the Y-axis direction) orthogonal to both of the first direction (the X-axis direction) and the optical axis direction (the Z-axis direction) is equal to or larger than a width of the battery BC. A part of the bottom part 41B other than the recess 44 is a flat surface 41BS that is provided along the X-axis direction and the Y-axis direction, and the recess 44 includes an inclined surface 44S that is connected to the flat surface 41BS (see FIG. 9A).

An arrow with symbol IN illustrated in FIGS. 9C to 9E, 10A, and 10B illustrates an insertion direction at the time of mounting the battery BC. The wall 41W1 faces a front end surface BC1 (FIG. 9C) of the battery BC that is inserted from the opening AP to the battery mounting section 41. A coiled battery ejection spring 42 that is in contact with the front end surface BC1 of the battery BC is provided at a part of the wall 41W1. The battery ejection spring 42 is a bias member biasing the battery BC in an ejection direction opposite to the insertion direction. The battery BC that has been mounted in the battery mounting section 41 is held by the battery ejection spring 42 and the wall 41W2. Further, a connection terminal that is to be connected to a terminal (not illustrated) of the battery BC is provided at other part of the wall 41W1. In addition, a finger insertion part 46 is provided at a part of the wall 41W2. The finger insertion part 46 is a concave part that is a space in which a user inserts a finger to touch the rear end surface BC2 when the user ejects the battery BC.

Figure 11A:
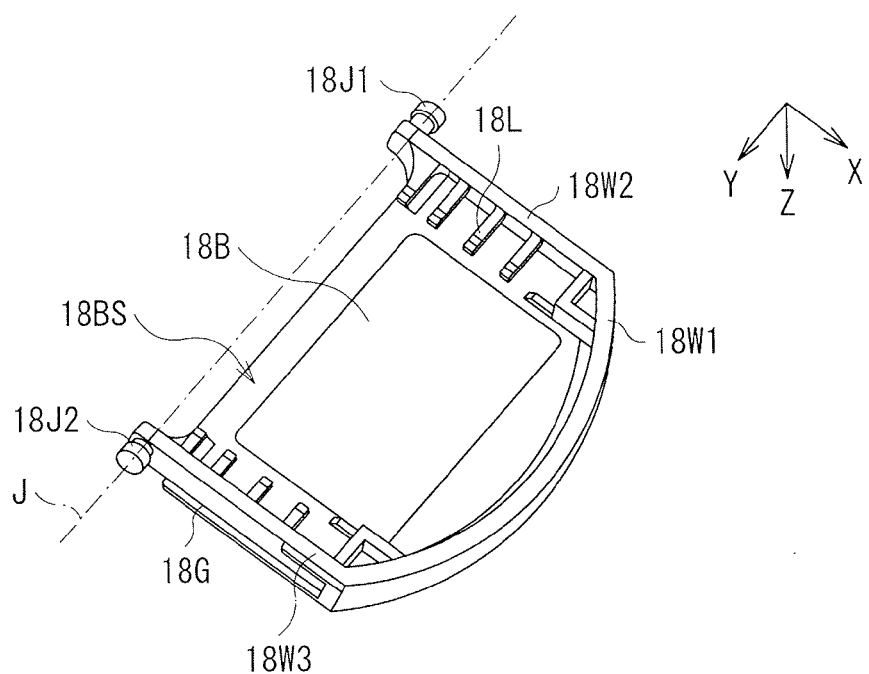
FIG. 11A is a perspective view illustrating detail of the battery lid of the image pickup apparatus illustrated in FIG. 1.

FIG. 11A is a perspective view illustrating a configuration of only the battery lid 18. The battery lid 18 has a flat base part 18B and a wall 18W standing on the outer edge thereof. The wall 18W may include, for example, a pair of walls 18W2 and 18W3 that extends in the first direction (the X-axis direction), and a wall 18W1 that connects the wall 18W2 with the wall 18W3. A guide groove 18G extending in the X-axis direction is provided on each of the pair of walls 18W2 and 18W3. Further, camshafts 18J1 and 18J2 extending along the pivot axis J are provided on the walls 18W2 and 18W3, respectively. The pivot axis J is an axis in a width direction of the battery lid 18 orthogonal to both of the first direction (the X-axis direction) and the optical axis direction (the Z-axis direction), and is parallel to the base part 18B. Note that the guide groove 18G and the camshafts 18J1 and 18J2 may be provided on both of the pair of walls 18W2 and 18W3, or may be provided on one of the pair of walls 18W2 and 18W3.

A plurality of ribs 18L standing toward the bottom part 41B are provided on an inner surface 18BS of the base part 18B, namely, on a surface facing the bottom part 41B of the battery mounting section 41 in the closed state. A front end of each of the ribs 18L may be in contact with the top surface BC2 of the battery BC mounted in the battery mounting section 41 as illustrated in FIG. 9B, and may function to hold the battery BC in the closed state. In addition, securing a space between the adjacent ribs 18L by providing the plurality of ribs 18L makes it possible to secure sufficient strength even when the base part 18B is reduced in thickness. Therefore, it is possible to reduce the weight.

With reference to FIG. 11B, FIGS. 12A to 12C, FIGS. 13A to 13C, FIGS. 14A to 14C, and FIGS. 15A and 15B, detailed configuration is described.

Figure 11B:
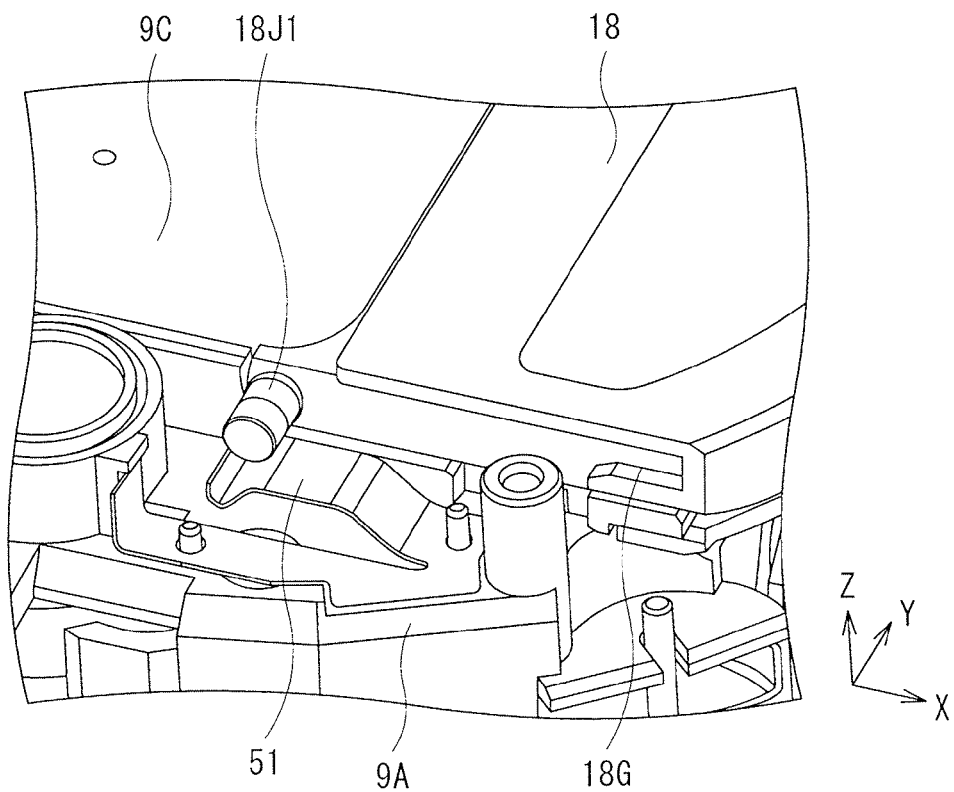
FIG. 11B is a perspective view illustrating a main part in the outer barrel of the image pickup apparatus illustrated in FIG. 1 in an enlarged manner.
Figure 12A:
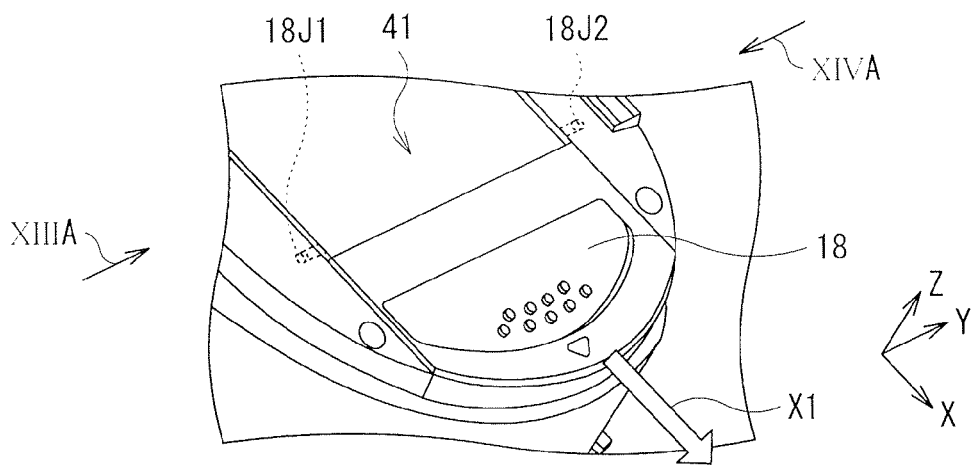
FIG. 12A is a perspective view illustrating the battery lid and the vicinity thereof in a closed state.
Figure 12B:
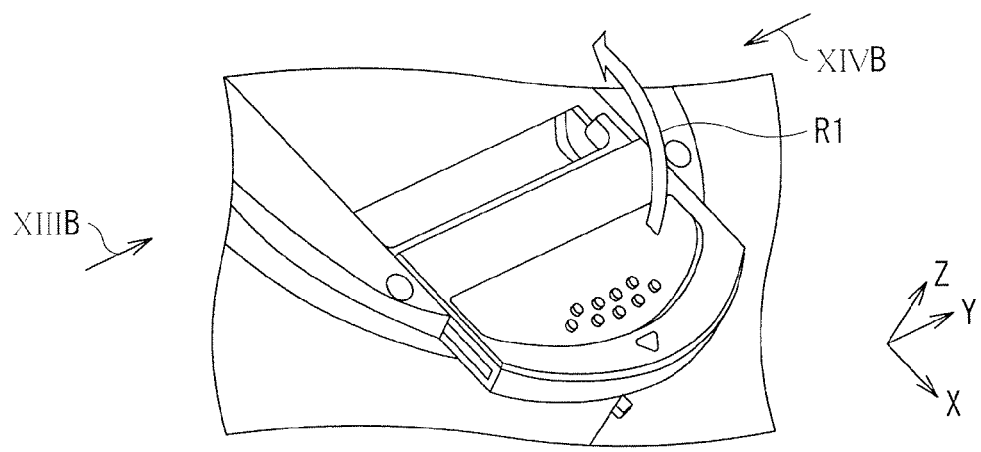
FIG. 12B is a perspective view illustrating the battery lid and the vicinity thereof in a slid state.
Figure 12C:
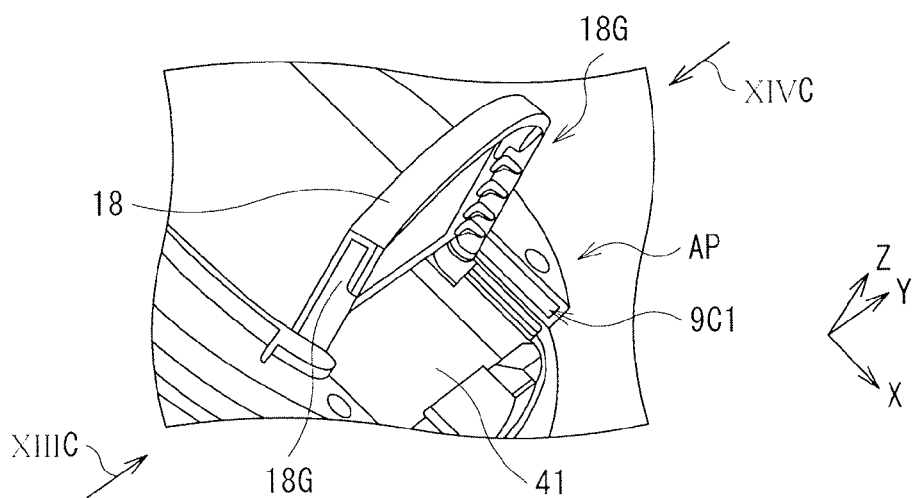
FIG. 12C is a perspective view illustrating the battery lid and the vicinity thereof in an open state.
Figure 13A:
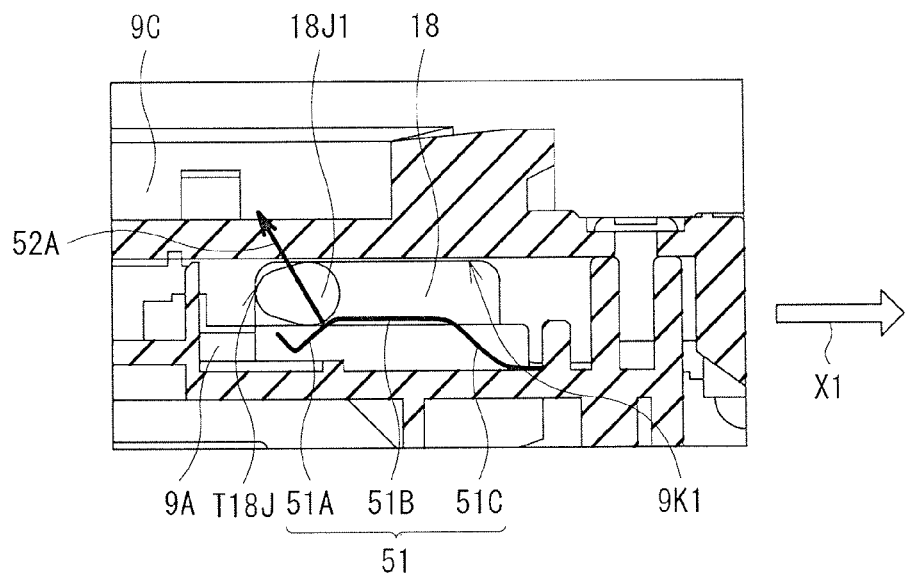
FIG. 13A is a side view illustrating a vicinity of a camshaft as viewed from a direction of an arrow XIIIA illustrated in FIG. 12A in an enlarged manner.
Figure 13B:
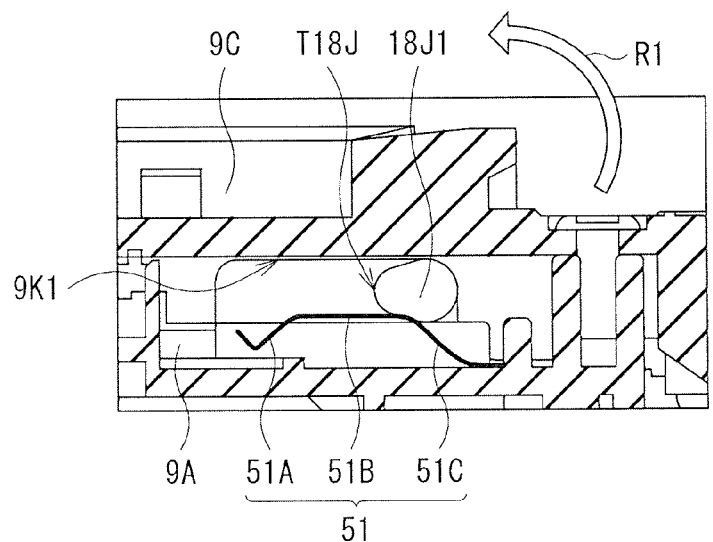
FIG. 13B is a side view illustrating the vicinity of the camshaft as viewed from a direction of an arrow XIIIB illustrated in FIG. 12B in an enlarged manner.
Figure 13C:
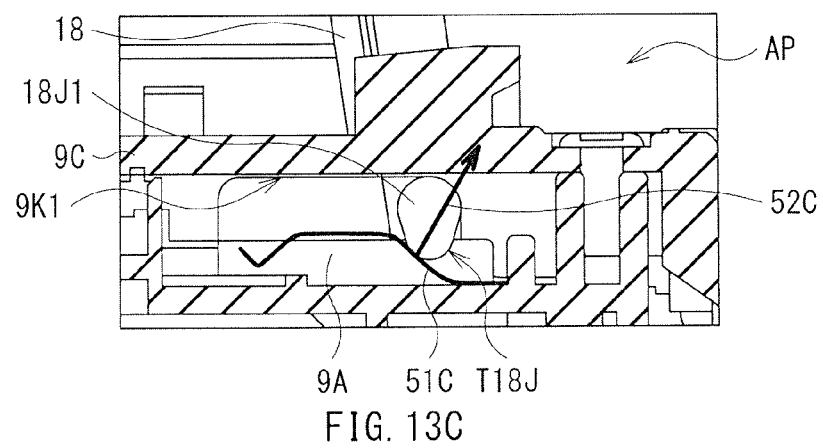
FIG. 13C is a side view illustrating the vicinity of the camshaft as viewed from a direction of an arrow XIIIC illustrated in FIG. 12C in an enlarged manner.
Figure 14A:
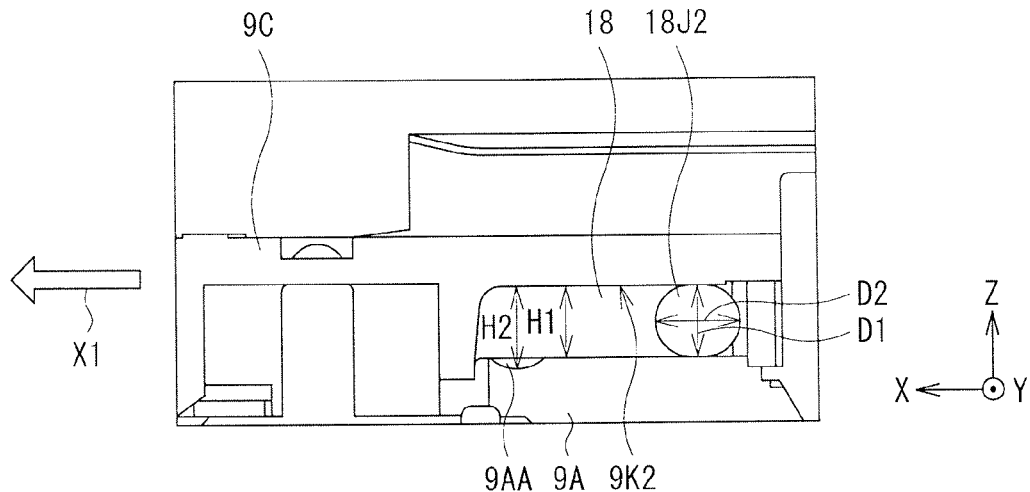
FIG. 14A is a side view illustrating the vicinity of the camshaft as viewed from a direction of an arrow XIVA illustrated in FIG. 12A in an enlarged manner.
Figure 14B:
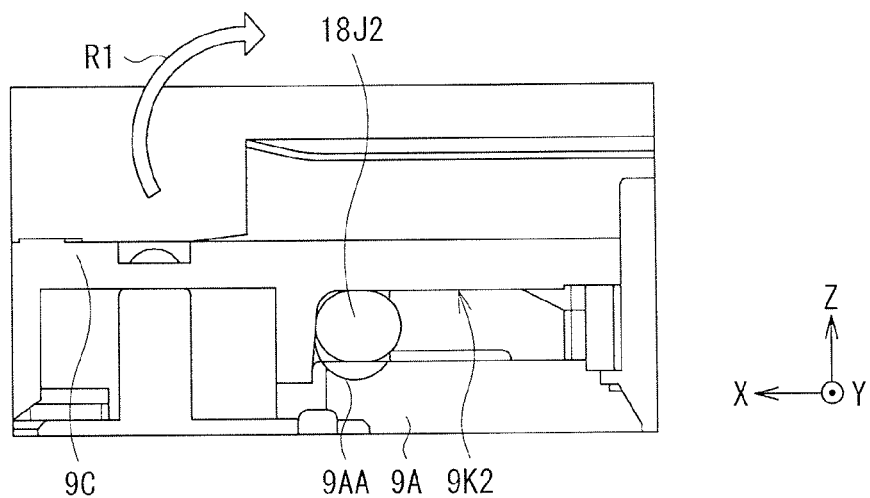
FIG. 14B is a side view illustrating the vicinity of the camshaft as viewed from a direction of an arrow XIVB illustrated in FIG. 12B in an enlarged manner.
Figure 14C:
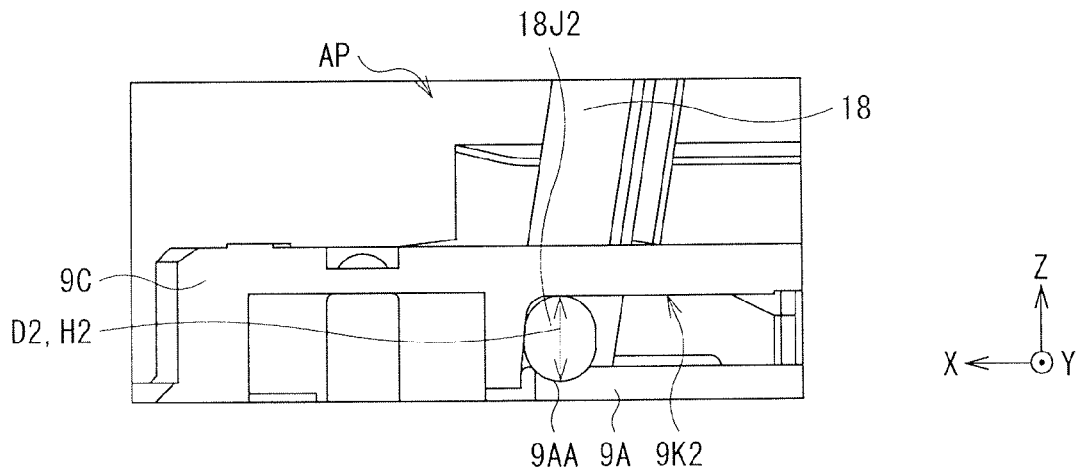
FIG. 14C is a side view illustrating the vicinity of the camshaft as viewed from a direction of an arrow XIVC illustrated in FIG. 12C in an enlarged manner.

FIG. 11B is a perspective view illustrating the vicinity of the cam shaft 18J1 in the closed state in an enlarged manner. FIG. 12A is a perspective view illustrating the battery lid 18 and the vicinity thereof in the closed state, FIG. 12B is a perspective view illustrating the battery lid 18 and the vicinity thereof in the slid state, and FIG. 12C is a perspective view illustrating the battery lid 18 and the vicinity thereof in the open state. FIG. 13A is a side view illustrating the vicinity of the camshaft as viewed from a direction of an arrow XIIIA illustrated in FIG. 12A in an enlarged manner. FIG. 13B is a side view illustrating the vicinity of the camshaft as viewed from a direction of an arrow XIIIB illustrated in FIG. 12B in an enlarged manner. FIG. 13C is a side view illustrating the vicinity of the camshaft as viewed from a direction of an arrow XIIIC illustrated in FIG. 12C in an enlarged manner. Further, FIG. 14A is a side view illustrating the vicinity of the camshaft as viewed from a direction of an arrow XIVA illustrated in FIG. 12A in an enlarged manner. FIG. 14B is a side view illustrating the vicinity of the camshaft as viewed from a direction of an arrow XIVB illustrated in FIG. 12B in an enlarged manner. FIG. 14C is a side view illustrating the vicinity of the camshaft as viewed from a direction of an arrow XIVC illustrated in FIG. 12C in an enlarged manner.

Figure 15A:
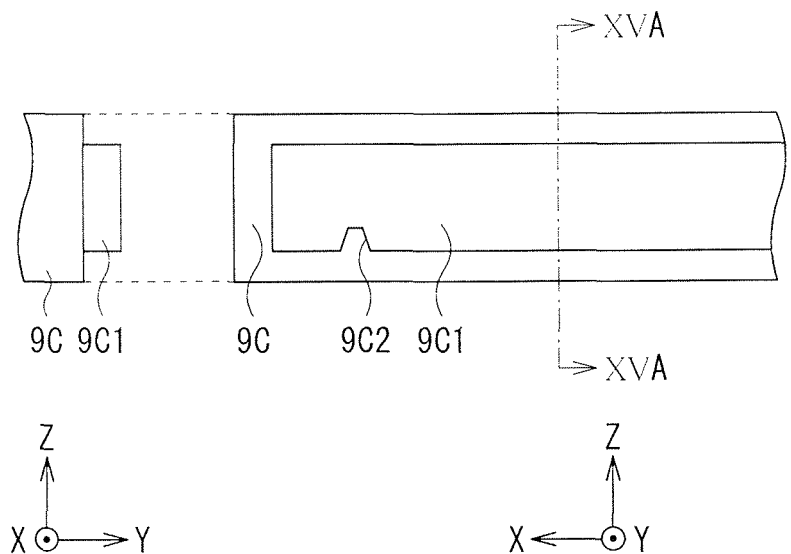
FIG. 15A is an explanatory diagram illustrating a detailed configuration of a surface facing a groove of the battery lid.
Figure 15B:
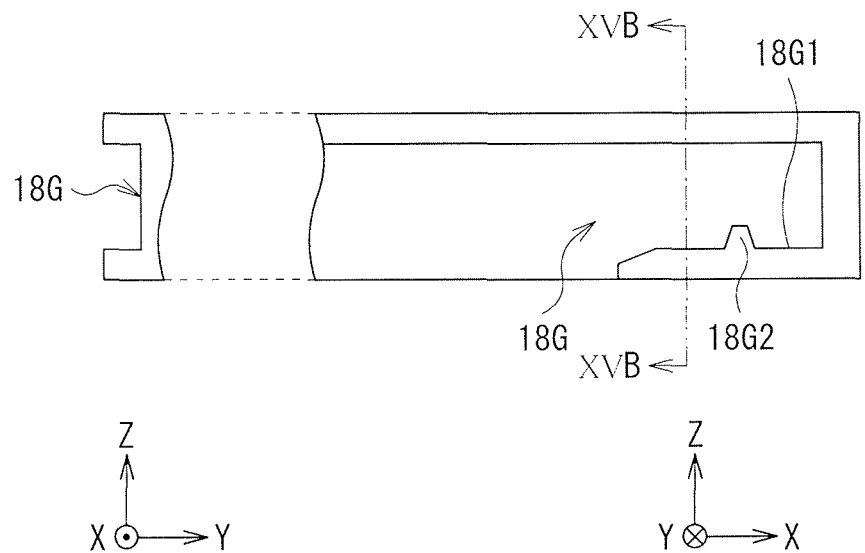
FIG. 15B is an explanatory diagram illustrating a detailed configuration of the groove of the battery lid.

A projection 9C1 extending in the first direction (the X-axis direction) is provided on a surface of the rear part 9C of the outer barrel 9 facing the pair of walls 18W2 and 18W3 (FIG. 12C). The projection 9C1 of the rear part 9C and the guide groove 18G of the battery lid 18 are engaged with each other from the closed state to the slid state. Accordingly, the battery lid 18 is guided in the first direction (the X-axis direction) during the state shift between the closed state and the slid state. More specifically, as illustrated in FIG. 15A, the projection 9C1 projecting +Y direction is provided on the surface of the rear part 9C facing the wall 18W2, and for example, a concave part 9C2 recessed in +Z direction may be provided on a part of the projection 9C1. Incidentally, in FIG. 15A, a figure on right side illustrates a configuration on XZ plane, and a figure on left side illustrates a sectional configuration in an arrow direction along a XVA-XVA line illustrated in the figure on right side. On the other hand, the groove 18G engaging with the projection 9C1 is provided on the wall 18W2 of the battery lid 18 as illustrated in FIG. 15B, and a convex part 18G2 projecting in the Z direction is provided at a part of the wall 18G1 forming the groove 18G. The convex part 18G2 is locked by the concave part 9C2 in the closed state. As a result, for example, when the image pickup apparatus 1 itself is inclined, the battery lid 18 is prevented from unintentionally sliding in the +X direction by own weight. Alternatively, a concave part may be provided on the groove 18G and a convex part may be provided on the projection 9C1.

A click spring 51 as a specific but non-limiting example of a locking member that locks the battery lid 18 both in the closed state and the open state is further attached to the outer barrel 9 (FIGS. 10A, 10B, 11B, and 13A to 13C). The click spring 51 is a plate spring that may include, for example, a first locking part 51A, a slide guide part 51B, and a second locking part 51C in order in the first direction (the X-axis direction). For example, the slide guide part 51B may be a flat part extending in the first direction, and the first locking part 51A and the second locking part 51B each may include an inclined surface inclined with respect to the slide guide part 51B. A cutout 9K1 extending in the first direction (the X-axis direction) is provided on the rear part 9C at a position corresponding to the click spring 51. The camshaft 18J1 of the battery lid 18 is inserted in a space between the cutout 9K1 and the barrel part 9A, and the camshaft 18J1 and the click spring 51 are in contact with each other. Here, for example, a height (a size in the Z-axis direction) of the cutout 9K1 may be substantially equal to a diameter of the camshaft 18J1. However, a convex part T18J having a diameter larger than a diameter of the other part is provided at a part of the camshaft 18J1.

As illustrated in FIGS. 14A to 14C, a cutout 9K2 extending in the first direction (the X-axis direction) is provided on the rear part 9C on a side opposite to the cutout 9K1, namely, at a position corresponding to the camshaft 18J2 of the battery lid 18. The camshaft 18J2 is inserted in a space between the cutout 9K2 and the barrel part 9A. The camshaft 18J2 is in contact with both of an edge of the cutout 9K2 and the barrel part 9A. The camshaft 18J2 has a substantially ellipsoidal sectional surface having a short diameter D1 and a long diameter D2. Here, a height H1 (a size in the Z-axis direction) of the space between the cutout 9K1 and the barrel part 9A is substantially equal to the short diameter D1 of the camshaft 18J2. Moreover, a concave part 9AA slightly recessed is provided in the barrel part 9A. The concave part 9AA is provided at a position corresponding to the camshaft 18J2 in the slid state. A height H2 (a size in the Z-axis direction) in a space between the cutout 9K1 and the concave part 9AA is larger than the height H1 and is substantially equal to the long diameter D2 of the camshaft 18J2.

The first locking part 51A locks the camshaft 18J1 of the battery lid 18 in the closed state (see FIG. 13A). More specifically, the first locking part 51A is in contact with the camshaft 18J1 to bias the camshaft 18J1 upward, and the first locking part 51A sandwiches the camshaft 18J1 with the edge of the cutout 9K1 to hold the battery lid 18. In the closed state, the convex part T18J of the camshaft 18J1 faces lateral direction, and the first locking part 51A is in contact with a part of the camshaft 18J1 other than the convex part T18J. Also, the second locking part 51C locks the camshaft 18J1 of the battery lid 18 in the open state (see FIG. 13C). More specifically, the second locking part 51C may be in contact with the convex part T18J of the camshaft 18J1 that faces downward, to bias the camshaft 18J1 upward. When the camshaft 18J1 is sandwiched between the second locking part 51C and the edge of the cutout 9K1, the battery lid 18 is held. Further, the slide guide part 51B functions to connect the first locking part 51A with the second locking part 51C, and to guide movement of the camshaft 18J1 in the X-axis direction (FIG. 13B).

3. Open-Close Operation of Battery Lid 18

Next, with mainly reference to FIGS. 12A to 12C, FIGS. 13A to 13C, and FIGS. 14A to 14C, open-close operation of the battery lid 18 is described.

At the time of performing open operation of the battery lid 18, first, the battery lid 18 slides in the direction of an arrow X1 along the X-axis to shift from the closed state illustrated in FIG. 12A and the like to the slid state illustrated in FIG. 12B and the like. After that, the battery lid 18 pivots in the direction of an arrow R1 around the pivot axis J extending in the second direction (the Y-axis direction), to shift from the slid state illustrated in FIG. 12B and the like to the open state illustrated in FIG. 12C and the like.

Behavior of the camshaft 18J1 during the open operation of the battery lid 18 is as described below. First, in the closed state, as illustrated in FIG. 13A, the camshaft 18J1 is located at a first end of the cutout 9K1 (a left end in FIG. 13A) and is biased toward oblique upper left (in a direction of an arrow 52A) by the first locking part 51A. As a result, the camshaft 18J1 is sandwiched between the first locking part 51A and an edge of a left end corner of the cutout 9K1, and is locked in the state where the battery lid 18 is closed. At this time, for example, the convex part T18J faces left direction (−X direction). When the battery lid 18 slides along the X-axis in the direction of the arrow X1 to shift to the slid state, the camshaft 18J1 moves to a second end (a right end in FIG. 13B) of the cutout 9K1 without pivoting as illustrated in FIG. 13B. Further, when the battery lid 18 shifts from the slid state (FIG. 13B) to the open state (FIG. 13B), the camshaft 18J1 pivots in the direction of the arrow R1, and the direction of the convex part T18J shifts from leftward to downward. In the closed state, as illustrated in FIG. 13C, the camshaft 18J1 is located at the second end (a right end in FIG. 13C) of the cutout 9K1 and is biased toward oblique upper right (in a direction of an arrow 52C) by the second locking part 51C. As a result, the camshaft 18J1 is sandwiched between the second locking part 51C and an edge of a right end corner of the cutout 9K1, and is locked in the state where the battery lid 18 is opened.

Behavior of the camshaft 18J2 during the open operation of the battery lid 18 is as described below. First, in the closed state, as illustrated in FIG. 14A, the camshaft 18J2 is located at a first end (a right end in FIG. 14A) of the cutout 9K2 and is sandwiched between the cutout 9K2 and the barrel part 9A. Here, since the direction of the height H1 of the space is coincident with the direction of the short diameter D1, although the camshaft 18J2 is not movable in the Z-axis direction, the camshaft 18J2 is movable in the direction of the arrow X1. When the battery lid 18 slides in the direction of the arrow X1 along the X-axis to shift to the slid state, the camshaft 18J2 moves to a second end (a left end in FIG. 14B) of the cutout 9K2 without pivoting as illustrated in FIG. 14B. Further, when the battery lid 18 shifts from the slid state (FIG. 14B) to the open state (FIG. 14B), the camshaft 18J2 pivots in the direction of the arrow R1, and the direction of the long diameter D2 becomes the Z-axis direction. Since the concave part 9AA is provided at the position of the barrel part 9A at the position corresponding to the camshaft 18J2, the camshaft 18J2 is pivotable. Incidentally, in the present embodiment, the click spring 51 is provided only at the position corresponding to the camshaft 18J1. However, the click spring 51 may be provided at a position corresponding to the camshaft 18J2.

A procedure inverted from above is performed during close operation of the battery lid 18.

4. Operation of Battery Exchange in Image Pickup Apparatus 1

When the battery BC is mounted, after the battery lid 18 is opened in a manner as described above, for example, the battery BC may be inserted in the battery mounting section 41 in a direction of an arrow IN as illustrated in FIG. 9C and FIG. 9D. At this time, since the recess 44 is provided, the battery BC may be inserted slightly oblique downward. Although the front end surface BC1 of the battery BC comes into contact with the battery ejection spring 42, it is possible to wholly house the battery BC in the battery mounting section 41 such that the rear end surface BC2 of the battery BC is in contact with the wall 41W2 by pressing the battery BC with force larger than the biasing force of the battery ejection spring 42 (FIG. 9E).

At the time of taking out the battery BC, after the battery lid 18 is opened, for example, a user inserts a finger in the finger insertion part 46, and rifts the rear end surface BC2 upward while slightly pressing the battery BC in the insertion direction (in the direction of the arrow IN), to release lock of the rear end surface BC2 by the wall 41W2. Then, when the user releases the finger from the battery BC, the battery BC is ejected to the front side by the biasing force of the battery ejection spring 42. As a result, the battery BC becomes partially holdable by the fingers, and take-out of the buttery BC becomes possible.

5. Modification of Image Pickup Apparatus 1

Figure 16:
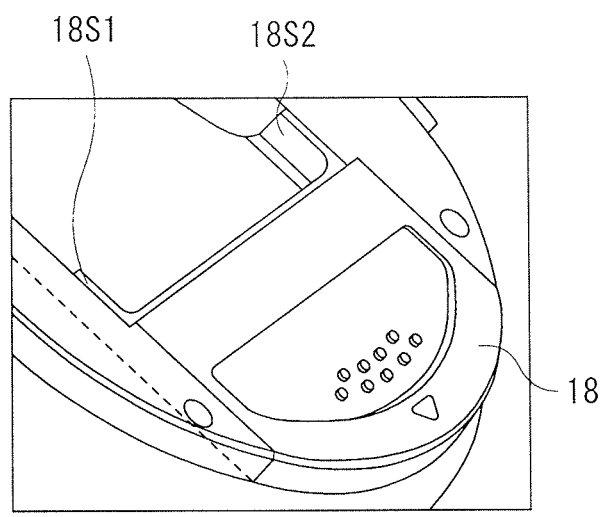
FIG. 16 is a perspective view illustrating a battery lid and the vicinity thereof in a modification of the image pickup apparatus illustrated in FIG. 1.
Figure 17A:
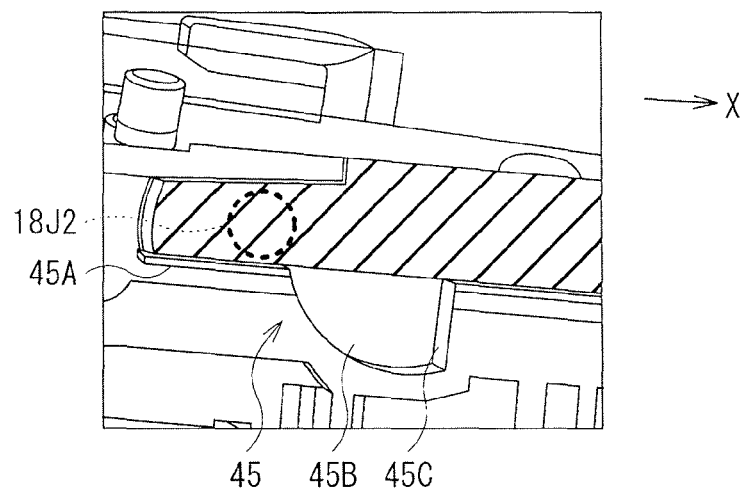
FIG. 17A is a perspective view illustrating a main part in the closed state in the modification of the image pickup apparatus illustrated in FIG. 1 in an enlarged manner.
Figure 17B:
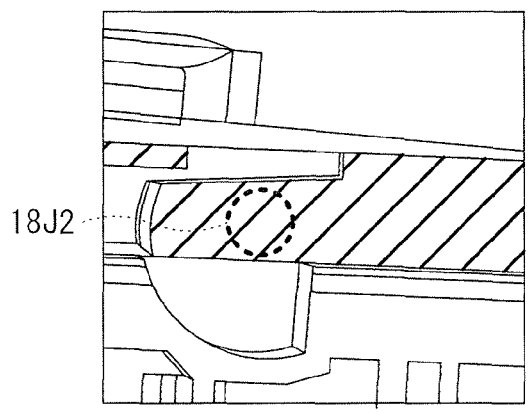
FIG. 17B is a perspective view illustrating the main part in the slid state in the modification of the image pickup apparatus illustrated in FIG. 1 in an enlarged manner.
Figure 17C:
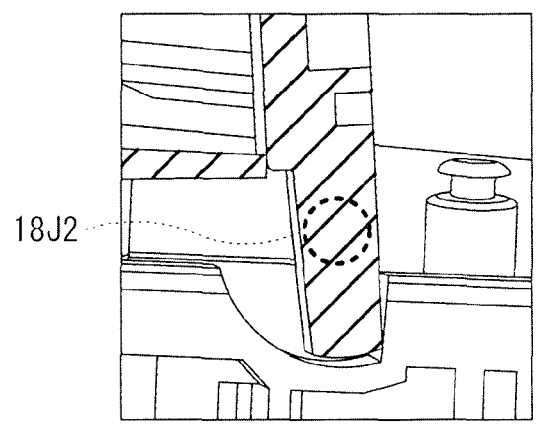
FIG. 17C is a perspective view illustrating the main part in the open state in the modification of the image pickup apparatus illustrated in FIG. 1 in an enlarged manner.

With reference to FIG. 16 and FIGS. 17A to 17C, a modification of the present embodiment is described. FIG. 16 is a perspective view illustrating the battery lid 18 and the vicinity thereof in the present modification. FIGS. 17A to 17C are perspective views illustrating a main part of the present modification in the closed state, in the slid state, and in the open state, respectively, in an enlarged manner. In FIG. 16, the rear part 9C and the connecting projections 15 are omitted. Moreover, in FIGS. 17A to 17C, only a part corresponding to the wall 18W3 of the battery lid 18 is illustrated, and the same configuration may be applied to the wall 18W2.

In the battery mounting section 41, a pivot locking section 45 that locks the pivot of the battery lid 18 may be further provided on a part of the walls 41W3 and 41W4 (FIGS. 17A to 17C). In this case, for example, locked parts 18S1 and 18S2 may be preferably provided on the battery lid 18 (FIG. 16). The locked parts 18S1 and 18S2 are plate members extending in a direction opposite to the wall 18W1 of the camshafts 18J1 and 18J2 on the extension of the walls 18W2 and 18W3, respectively.

The pivot locking section 45 includes a surface 45A, a concave part 45B, and a surface 45C that configures a part of the concave part 45B. The surface 45A locks the locked parts 18S1 and 18S2 in the state where the battery lid 18 is closed. The concave part 45B is a part providing a space in which the locked parts 18S1 and 18S2 pivot around the pivot axis J. In addition, the surface 45C locks the locked parts 18S1 and 18S2 in the state where the battery lid 18 is opened.

When such a pivot locking section 45 is provided, the battery lid 18 is held more strongly by the rear part 9C both in the closed state and the open state, and it is possible to enhance usability of a user.

7. Application Examples of Image Pickup Apparatus 1

Figure 18:
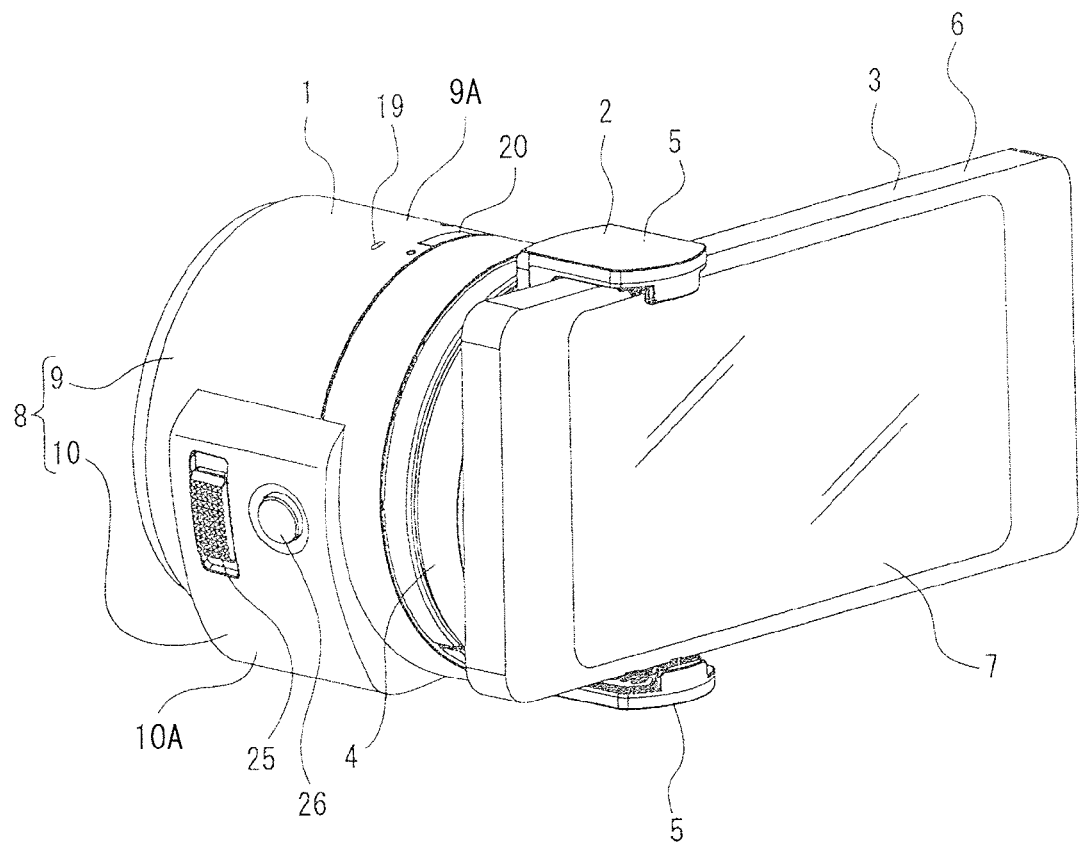
FIG. 18 is a perspective view illustrating an application example of the image pickup apparatus illustrated in FIG. 1.
Figure 19:
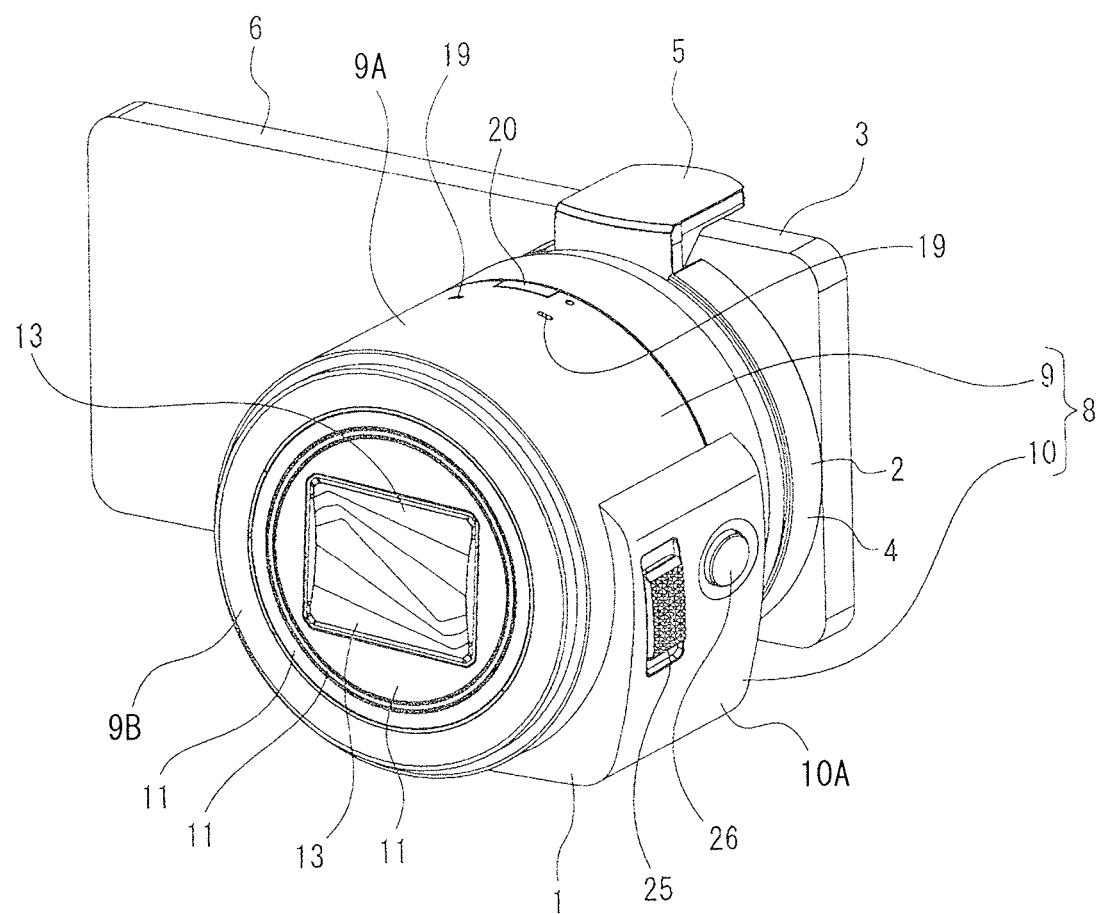
FIG. 19 is another perspective view illustrating an application example of the image pickup apparatus illustrated in FIG. 1.

The adapter 2 is attached to the back surface of the image pickup apparatus 1, and the image pickup apparatus 1 is detachable to the display unit 3 with the adapter 2, as illustrated in FIG. 18 and FIG. 19.

The adapter 2 is configured of necessary sections that are disposed inside and outside a base body 4. A pair of mounted bodies 5 pivotable with respect to the base body 4 is provided on the adapter 2. The mounted bodies 5 are pivotable at opposite positions with a center part of the base body 4 in between, and pivot between a housed position in which the mounted bodies 5 are housed in a housing concave part of the base body 4 and an extended position in which the mounted bodies 5 are extended from the housing concave part. One of the mounted bodies 5 is movable with respect to the other mounted body 5 in a contacting/separating direction (in the top-down direction), and one of the mounted bodies 5 is biased in a direction approaching the other mounted body 5 by a unillustrated spring. The mounted bodies 5 are attached to the display unit 3 so as to sandwich the display unit 3 in the top-down direction while being pivot to the extended position. At this time, since one of the mounted bodies 5 is biased in the direction approaching the other mounted body 5, the mounted bodies 5 sandwich the display unit 3 in the top-down direction, and thus stable attached state of the adapter 2 to the display unit 3 is secured.

The connecting projections 15 of the image pickup apparatus 1 are inserted in connection holes of the adapter 2 and connected with the adapter 2. When the connecting projections 15 are inserted in the connection holes of the adapter 2 and connected with the adapter 2, and the adapter 2 is pivot to a predetermined position in a circumferential direction of the base body 4 with respect to the image pickup apparatus 1, the lock pin 16 is moved backward by the biasing force by the spring, and the lock pin 16 is inserted to a lock hole of the adapter 2. As a result, the adapter 2 is attached to the image pickup apparatus 1 while being locked.

On the other hand, when the lock releasing lever 17 is operated, the lock pin 16 is moved forward against the biasing force and then is drawn from the lock hole, and the lock to the adapter 2 by the lock pin 16 is released. When the adapter 2 is rotated to a predetermined position in the circumferential direction of the base body 4 with respect to the image pickup apparatus 1, the connecting projections 15 are drawn from the connection holes of the adapter 2, which makes it possible to detach the adapter 2 from the image pickup apparatus 1.

The display unit 3 may be, for example, a mobile phone such as a smartphone. However, the display unit 3 is not limited to a mobile phone, and may be other devices, for example, a mobile terminal or a television system as long as the display unit 3 has a display function. In the display unit 3, a display panel 7 is provided in a housing 6 that is a substantially rectangular parallelepiped case body 6. The display panel 7 is configured as a touch panel, and a predetermined function is executed when contact operation is performed on a predetermined position of the display panel 7.

7. Internal Configuration of Image Pickup Apparatus 1

Figure 20:
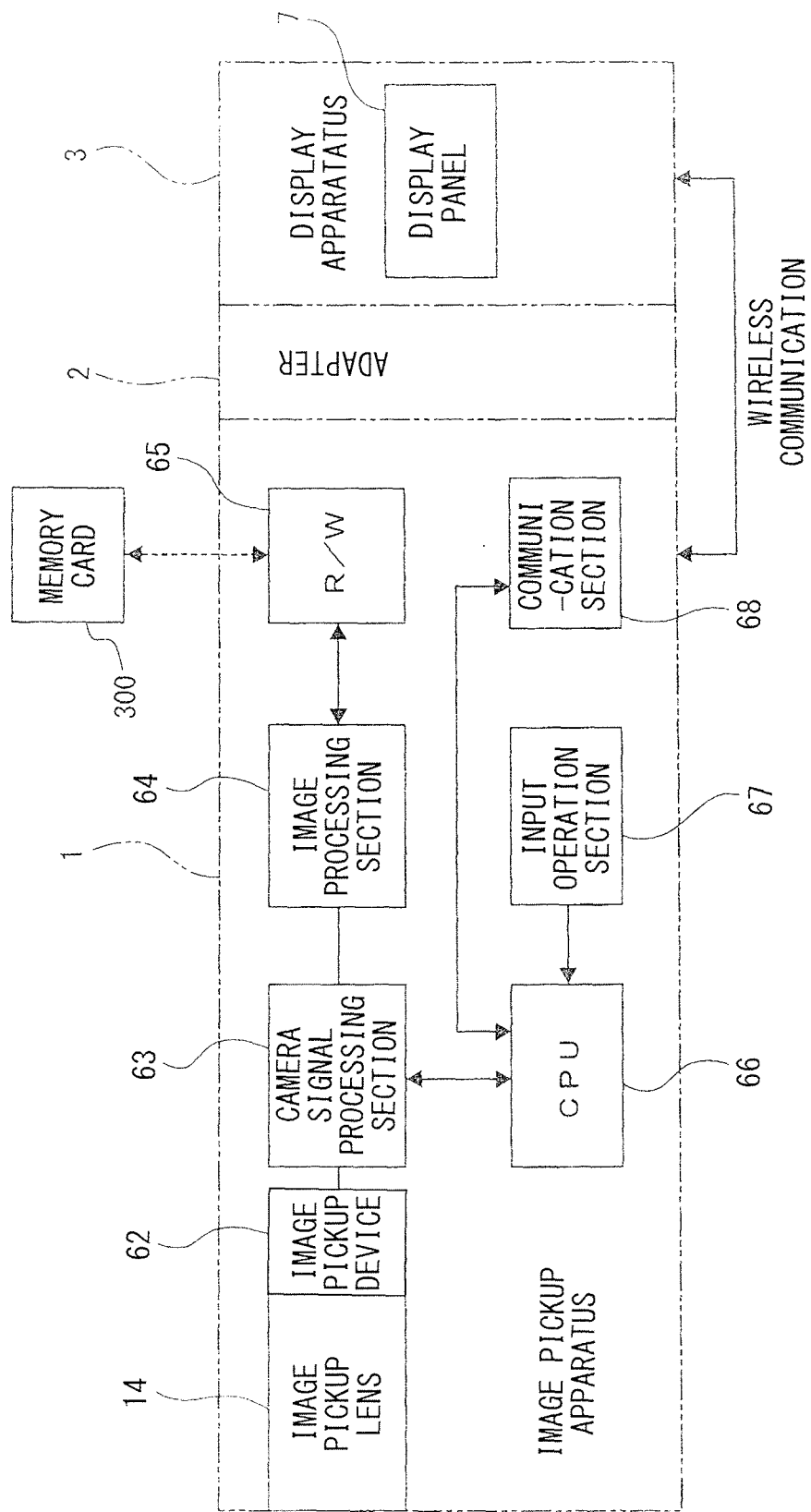
FIG. 20 is a block diagram illustrating an example of an internal configuration of the image pickup apparatus illustrated in FIG. 1.

FIG. 20 illustrates an example of a block diagram as an internal configuration of the image pickup apparatus 1. Note that the image pickup apparatus 1 is attached to the display unit 3 including the display panel 7 with the predetermined adapter 2, and operates in conjunction with the display unit 3.

The image pickup apparatus 1 includes the image pickup lens 14, the image pickup device 62, a camera signal processing section 63, an image processing section 64, a reader/writer (R/W) 65, a central processing unit (CPU) 66, an input operation section 67, and a communication section 68. The image pickup device 62 photoelectrically converts light taken-in through the image pickup lens 14. The camera signal processing section 63 performs signal processing such as analog-digital conversion of picked-up image signals. The camera signal processing section 63 may perform various kinds of signal processing such as conversion of the output signal from the image pickup device 62 into a digital signal, noise removal, image quality correction, and conversion into a luminance color difference signal. The image processing section 64 performs recording reproducing processing of the image signal.

For example, the image processing section 64 may perform compression coding processing and expansion decoding processing of the image signal, conversion processing of data specification such as resolution, and the like, based on a predetermined image data format. The R/W 65 performs writing of the image data that has been encoded by the image processing section 64, to a memory card 300 and performs reading of the image data recorded in the memory card 300. The CPU 66 controls the entire image pickup apparatus 1. In other words, the CPU 66 functions as a control processing section that controls each section provided in the image pickup apparatus 1, and controls each section based on an instruction input signal and the like from the input operation section 67. The input operation section 67 includes various kinds of switches and the like including the zoom lever 25 and the photographing button 26 that are operated by a user. The communication section 68 performs wireless communication with external devices.

The CPU 66 is adapted to transmit and receive various kinds of data and control information to/from the display unit 3 through the wireless communication by the communication section 68 that has an NFC communication section and a WIFI communication section. The input operation section 67 outputs the instruction input signal corresponding to the operation by the user, to the CPU 66. For example, the memory card 300 may be a semiconductor memory that is detachable to the memory card slot connected with the R/W 65.

Further, in the image pickup apparatus 1, performing the wireless communication through the communication section 68 makes it possible to perform various kinds of operation such as display of the image and the picture picked up by the image pickup apparatus 1 on the display unit 3, storage of the picked-up image and picture, execution of pick-up function of the image pickup apparatus 1 by operation to the display unit 3, and execution of zooming function of the image pickup apparatus 1 by operation to the display unit 3.

Specifically, for example, the near field communication (NFC) communication section (NFC tag) that performs NFC communication may be mounted on the inside of the barrel part 9A of the outer barrel 9, and non-contact communication may be performed between the NFC communication section and an NFC communication section mounted on the display unit 3. In addition, for example, a wireless fidelity (WIFI) communication section may be provided for transmission of the picked-up image or the like, and the wireless communication may be performed between the WIFI communication section and a WIFI communication section mounted on the display unit 3.

The image pickup apparatus 1 is turned on by operation with respect to the power button 20, and the image pickup apparatus 1 may be turned on by the NFC communication from the display unit 3. For example, the image pickup apparatus 1 may be turned on when the NFC communication is established. Moreover, in the image pickup apparatus 1, display of the NFC communication function is performed in the vicinity of the power button 20 on the upper end part of the barrel part 9A or the like, which allows a user to easily confirm whether the power on operation is performed, and therefore, usability of the image pickup apparatus 1 is improved.

Further, the image pickup apparatus 1 is used while being mounted on a placing surface of a desk, a table, or the like in some cases. In such a usage state, normally, a user brings the display unit 3 close to the image pickup apparatus 1 from above. Therefore, providing the NFC communication section on an upper side in the barrel part 9A makes placement suitable for the near field wireless communication even in such a usage state.

8. Pick-Up Operation of Image Pickup Apparatus 1

Operation of the image pickup apparatus 1 is described below with reference to FIG. 20.

When the pick-up operation is performed in response to the instruction input signal from the input operation section 67, a picked-up image signal is output from the camera signal processing section 63 to the image processing section 64 and is subjected to compression coding processing, and is thus converted into digital data of a predetermined data format. The converted data is output to the R/W 65, and is written into the memory card 300. Note that the converted data may be transferred to the external display unit 3 through the wireless communication, and then output to the display panel 7 or written into a recording section of the display unit 3. When the image data recorded in the memory card 300 is reproduced, predetermined image data is read out from the memory card 300 by the R/W 65 in response to the operation with respect to the input operation section 67. Then, after the read image data is subjected to expansion decoding processing by the image signal processing section 64, the resultant image data is transferred as reproduction image signal to the display unit 3 through the wireless communication, and the reproduction image signal is output to the display panel 7 to display a reproduction image.

9. Function and Effect of Image Pickup Apparatus 1

In this way, in the image pickup apparatus 1 according to the present embodiment, the main body 8 includes the click spring 51 that locks the battery lid 18 both in the closed state and the open state. Therefore, when the image pickup apparatus 1 is used while the battery lid 18 is closed, the battery lid 18 is prevented from carelessly opening, and thus dropping off of the battery BC, interference of photographing operation, etc. are difficult to occur. On the other hand, it is possible for a user to smoothly insert or eject the battery BC with user's hand off the battery lid 18. In other words, according to the image pickup apparatus 1, it is possible to exert excellent operability while securing a simple configuration without increasing the number of components.

Moreover, after the shift from the closed state to the slid state, the battery lid 18 pivots around the pivot axis J to shift from the slid state to the open state. As described above, since state variation of two stages are present from the closed state to the open state in the image pickup apparatus 1, it is difficult for the battery lid 18 to unintentionally open. In addition, relative size of the battery lid 18 to the image pickup apparatus 1 is further decreased, and reduction in weight of the battery lid 18 is achieved. Therefore, usability for the user is improved. Further, the camshaft 8J1 is pressed against the cutout 9K1 by the slide guide part 51B of the click spring 51 when the battery lid 18 shifts from the closed state to the slid state. Therefore, the battery lid 18 does not open before the shift to the slid state.

Moreover, in the case where the pivot locking section 45 locking the pivot of the battery lid 18 is provided on a part of the walls 41W3 and 41W4 of the battery mounting section 41, the battery lid 18 is held more solidly by the rear part 9C both in the closed state and the open state, which makes it possible to enhance usability of a user.

Moreover, the battery ejection spring 42 is provided on the wall 41W1 of the battery mounting section 41. Therefore, it is possible to take out the battery BC smoothly. Further, when the battery BC is mounted in the battery mounting section 41, the battery BC is held by the battery ejection spring 42 and the wall 41W2. Therefore, the operation of closing the battery lid 18 is easily performed. In addition, the battery BC is not immediately ejected to the outside when the battery lid 18 is opened. Specifically, the battery BC is ejected by the battery ejection spring 42 when the user releases the state where the battery BC is locked by the wall 41W2. Therefore, dropping off of the battery BC by the user is prevented.

Further, the recess 44 is provided on a part of the bottom part 41B of the battery mounting section 41. Therefore, it is possible to take out battery BC more smoothly without increasing the size of the opening AP.

Hereinbefore, although the disclosure has been described with referring to the embodiment and the modification, the disclosure is not limited to the above-described embodiment and the like, and various modifications may be made. For example, the image pickup apparatus as an electronic apparatus has been described as an example in the above-described embodiment and the like. However, the disclosure is not limited thereto. For example, the disclosure may be applied to various electronic apparatuses such as a tablet terminal and a portable picture display unit.

Figure 21:
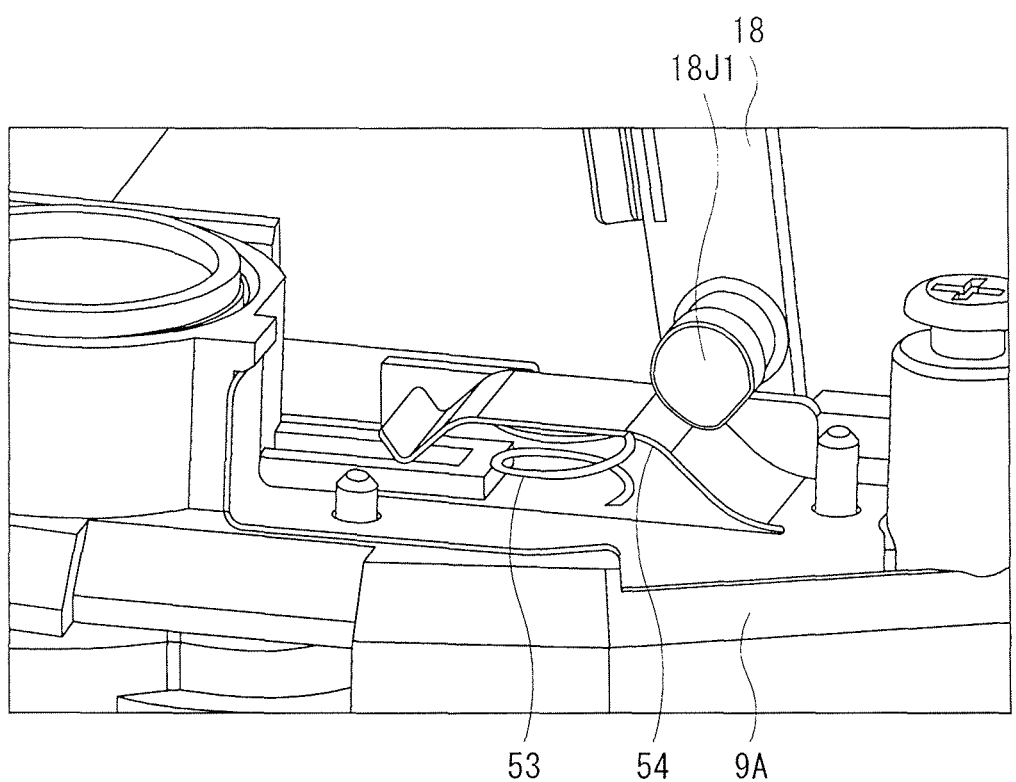
FIG. 21 is a perspective view illustrating a main part in another modification of the image pickup apparatus illustrated in FIG. 1.

Further, in the above-described embodiment and the like, the example in which the click spring 51 that is a plate spring is used as the locking member has been described. However, the disclosure is not limited thereto. For example, as with a modification (a second modification) illustrated in FIG. 21, a structure in which a compression coiled spring 53 and a plate member 54 are combined may be used as a locking member. In this case, the plate member 54 is pressed against the camshaft 18J1 by biasing force of the compression spring 53.

Note that the effects described in the present specification are illustrative and non-limiting. Effects achieved by the technology may be effects other than those described above. Moreover, the technology may be configured as follows.

(1) An electronic apparatus including:
a main body including a housing section that houses a battery;
a lid attached to the main body to cover the housing section, the lid being adapted to perform state shift between a closed state and an open state; and
a locking member attached to the main body, the locking member locking the lid both in the closed state and in the open state.

(2) The electronic apparatus according to (1), wherein the lid shifts from the closed state to a slid state in which the lid slides in a first direction, and further shifts from the slid state to the open state by pivoting around a pivot axis intersecting the first direction.

(3) The electronic apparatus according to (2), wherein the housing section includes a bottom part opposed to the lid, and a wall standing along an outer edge of the bottom part, and
a pivot locking section locking pivot of the lid is provided at a part of the wall.

(4) The electronic apparatus according to (2) or (3), wherein
the lid includes a camshaft extending along the pivot axis, and the locking member includes a plate member including a first locking part, a second locking part, and a slide guide part, the first locking part locking the camshaft of the lid in the closed state, the second locking part locking the camshaft of the lid in the open state, and the slide guide part connecting the first locking part with the second locking part and guiding movement of the camshaft.

(5) The electronic apparatus according to any one of (2) to (4), wherein the lid includes a groove extending along the first direction, the main body includes a projection engaged with the groove, and the projection is guided by the groove when the lid shifts from the closed state to the slid state.

(6) The electronic apparatus according to (5), wherein a convex part is provided at a part of the groove, and a concave part that locks the convex part in the closed state is provided on the projection, or a concave part is provided at a part of the groove, and a convex part that is locked by the concave part in the closed state is provided on the projection.

(7) The electronic apparatus according to any one of (2) to (6), wherein the main body further includes an image pickup lens, and the first direction is orthogonal to an optical axis of the image pickup lens.

(8) The electronic apparatus according to (7), wherein the main body further includes a light transmission hole guiding external light to the image pickup lens, and the lid is provided on a back surface of the main body on a side opposite to the light transmission hole.

(9) The electronic apparatus according to (5), wherein the groove is provided on each of both ends of the lid in a second direction that intersects the first direction.

(10) The electronic apparatus according to any one of (2) to (9), wherein the lid covers a part of the housing section, and the lid and the main body form an opening that allows ejection and insertion of the battery in the open state.

(11) The electronic apparatus according to (10), further including a biasing member provided in the housing section, the biasing member coming into contact with a front end surface of the battery to bias the battery in the first direction, the battery being inserted to the housing section through the opening.

(12) The electronic apparatus according to (11), wherein the housing section includes a bottom part, a first wall, and a second wall, the bottom part facing the lid, the first wall being provided with the biasing member, and the second wall being opposed to the first wall, and the battery housed in the housing section is held by the biasing member and the second wall.

(13) The electronic apparatus according to (12), wherein the bottom part of the housing section includes a recess at a position close to the first wall rather than a middle position between the first wall and the second wall, the recess having a width in a second direction equal to or larger than a width of the battery, and the second direction intersecting the first direction.

(14) The electronic apparatus according to (13), wherein a part of the bottom part other than the recess is a flat surface spreading along the first direction and the second direction, and the recess includes an inclined surface connected to the flat surface.

(15) The electronic apparatus according to any one of (11) to (14), wherein the biasing member is a coil spring.

(16) The electronic apparatus according to any one of (1) to (15), wherein the lid includes an inner surface and one or more ribs, the inner surface facing the battery housed in the housing section, and the one or more ribs each standing on the inner surface and each coming into contact with the battery housed in the housing section.

It should be understood by those skilled in the art that various modifications, combinations, sub-combinations, and alterations may occur depending on design requirements and other factors insofar as they are within the scope of the appended claims or the equivalents thereof.

What is claimed is:

1. An electronic apparatus, comprising:
   a main body including a housing section, wherein the housing section is configured to house a battery;
   a lid attached to the main body, wherein the lid is configured to cover the housing section, wherein the lid is further configured to:
   shift from a closed state to a slid state in which the lid is configured to slide in a first direction; and
   shift from the slid state to an open state by pivoting around a pivot axis, wherein the pivot axis intersects the first direction; and
   a locking member attached to the main body, wherein the locking member is configured to lock the lid both in the closed state and in the open state.

2. The electronic apparatus according to claim 1, wherein the housing section includes:
   a bottom part opposed to the lid; and
   a wall standing along an outer edge of the bottom part, and
   wherein a part of the wall comprises a pivot locking section configured to lock a pivot of the lid.

3. The electronic apparatus according to claim 1, wherein the lid includes a camshaft configured to extend along the pivot axis, and
   the locking member includes a plate member,
   wherein the plate member includes:
   a first locking part, wherein the first locking part is configured to lock the camshaft of the lid in the closed state;
   a second locking part, wherein the second locking part is configured to lock the camshaft of the lid in the open state; and
   a slide guide part, wherein the slide guide part is configured to:
   connect the first locking part with the second locking part; and
   guide movement of the camshaft.

4. The electronic apparatus according to claim 1, wherein the lid further includes a groove extending along the first direction,
   the main body further includes a projection, wherein the projection is configured to engage with the groove, and
   the projection is configured to be guided by the groove based on the shift of the lid from the closed state to the slid state.

5. The electronic apparatus according to claim 4, wherein a part of the groove comprises a convex part, and
   the projection comprises a concave part, wherein the concave part is configured to lock the convex part in the closed state.

6. The electronic apparatus according to claim 1, wherein the main body further includes an image pickup lens, and the first direction is orthogonal to an optical axis of the image pickup lens.

7. The electronic apparatus according to claim 6, wherein the main body further includes a light transmission hole configured to guide external light to the image pickup lens, and
a back surface of the main body on a side opposite to the light transmission hole comprises the lid.

8. The electronic apparatus according to claim 4, wherein each of both ends of the lid comprises the groove,
wherein the both ends of the lid are in a second direction that intersects the first direction.

9. The electronic apparatus according to claim 1, wherein the lid is further configured to cover a part of the housing section, and
the lid and the main body are further configured to form an opening, wherein the opening is configured to allow ejection and insertion of the battery in the open state.

10. The electronic apparatus according to claim 9, further comprising
a biasing member in the housing section, the biasing member comes into contact with a front end surface of the battery to bias the battery in the first direction, the battery that is inserted to the housing section through the opening.

11. The electronic apparatus according to claim 10, wherein
the housing section includes a bottom part, a first wall, and a second wall, the bottom part facing the lid, the first wall that is with the biasing member, and the second wall that is opposed to the first wall, and
the battery housed in the housing section is held by the biasing member and the second wall.

12. The electronic apparatus according to claim 11, wherein
the bottom part of the housing section includes a recess at a position close to the first wall rather than a middle position between the first wall and the second wall, the recess having a width in a second direction equal to or larger than a width of the battery, and the second direction intersects the first direction.

13. The electronic apparatus according to claim 12, wherein
a part of the bottom part other than the recess is a flat surface spreading along the first direction and the second direction, and
the recess includes an inclined surface connected to the flat surface.

14. The electronic apparatus according to claim 10, wherein
the biasing member is a coil spring.

15. The electronic apparatus according to claim 1, wherein
the lid further includes an inner surface and at least one rib,
the inner surface is configured to face the battery housed in the housing section, and
each of the at least one rib is configured to stand on the inner surface and come into contact with the battery housed in the housing section.

16. The electronic apparatus according to claim 4, wherein
a part of the groove comprises a concave part, and
the projection comprises a convex part, wherein the convex part is configured to be locked by the concave part in the closed state.

17. An electronic apparatus, comprising:
a main body comprising a housing section, wherein the housing section is configured to house a battery;
a lid attached to the main body, wherein the lid is configured to:
cover the housing section; and
shift between a closed state and an open state; and
a locking member attached to the main body, wherein the locking member is configured to lock the lid both in the closed state and in the open state,
wherein
the lid further includes an inner surface and at least one rib,
the inner surface is configured to face the battery housed in the housing section, and
each of the at least one rib is configured to stand on the inner surface and come into contact with the battery housed in the housing section.

* * * * *